United States Patent [19]

Ishikawa et al.

[11] Patent Number: 5,666,655

[45] Date of Patent: Sep. 9, 1997

[54] MOBILE COMMUNICATION SYSTEM WITH AUTONOMOUS DISTRIBUTED TYPE DYNAMIC CHANNEL ALLOCATION SCHEME

[75] Inventors: Yoshihiro Ishikawa; Narumi Umeda, both of Yokohamashi, Japan

[73] Assignee: NTT Mobile Communication Network Inc., Tokyo, Japan

[21] Appl. No.: 382,586

[22] Filed: Feb. 2, 1995

[30] Foreign Application Priority Data

| Feb. 4, 1994 | [JP] | Japan | 6-012636 |
| May 20, 1994 | [JP] | Japan | 6-106957 |
| Jun. 16, 1994 | [JP] | Japan | 6-134188 |
| Jun. 20, 1994 | [JP] | Japan | 6-137611 |

[51] Int. Cl.$^6$ ............................................. H04Q 7/20
[52] U.S. Cl. .............. 455/512; 455/62; 455/166.2; 455/161.1; 455/185.1; 455/519; 455/452
[58] Field of Search .................. 455/33.1, 34.1, 455/34.2, 54.1, 54.2, 56.1, 67.1, 62, 161.1, 166.1, 166.2, 185.1, 186.1; 379/59, 60

[56] References Cited

U.S. PATENT DOCUMENTS

| 4,747,101 | 5/1988 | Akaiwa et al. | 455/34.2 |
| 5,263,176 | 11/1993 | Kojima et al. | 455/34.1 |
| 5,349,632 | 9/1994 | Nagashima | 455/34.1 |
| 5,504,939 | 4/1996 | Mayrand et al. | 455/34.2 |

FOREIGN PATENT DOCUMENTS

| 0 513 841 | 11/1992 | European Pat. Off. |
| 0 522 276 | 1/1993 | European Pat. Off. |
| 61-244137 | 10/1986 | Japan |
| 62-91033 | 4/1987 | Japan |
| 1-306417 | 7/1991 | Japan |
| 2 266 433 | 10/1993 | United Kingdom |

OTHER PUBLICATIONS

Furuya, Yukitsuna, et al.; "Channel Segregation, a Distributed Adaptive Channel Allocation Scheme for Mobile Communication Systems", IEICE Transactions, vol. E 74, No. 6, Jun. 1991, pp. 1531–1537.

*Primary Examiner*—Reinhard J. Eisenzopf
*Assistant Examiner*—Doris To
*Attorney, Agent, or Firm*—Oblon, Spivak, McClelland, Maier & Neustadt, P.C.

[57] ABSTRACT

A mobile communication system using an autonomous distributed type dynamic channel allocation scheme, in which each base station manages allocation priority levels for the available radio channels according to past records of channel use for each radio channel, and updates the allocation priority level of each radio channel by weighting past allocation accept/reject judgement results for each radio channel with weight factors which vary according to time intervals of the past allocation accept/reject judgement results from a current time. The mobile stations can be grouped into N groups according to states of the mobile stations and N sets of allocation priority levels for each radio channel in correspondence to these N groups can be managed at each base station. The thresholds for grouping the mobile stations can be determined according to past records of states of the mobile stations.

40 Claims, 26 Drawing Sheets

| CHANNEL ID | USED / UNUSED FLAG | PRIORITY LEVEL TABLE | | |
|---|---|---|---|---|
| | | #1 | --- | #N |
| $ch_1$ | 0 | $P_{1,1}$ | --- | $P_{N,1}$ |
| $ch_2$ | 1 | $P_{1,2}$ | --- | $P_{N,2}$ |
| ⋮ | ⋮ | ⋮ | ⋮ | ⋮ |
| $ch_{M-1}$ | 0 | $P_{1,M-1}$ | --- | $P_{N,M-1}$ |
| $ch_M$ | 0 | $P_{1,M}$ | --- | $P_{N,M}$ |

| PRIORITY LEVEL TABLE NUMBER | DISTANCE THRESHOLD | MOVING DIRECTION THRESHOLD | MOVING SPEED THRESHOLD |
|---|---|---|---|
| #1 | $TL_1$ | $TD_1$ | $TV_1$ |
| #2 | $TL_2$ | $TD_2$ | $TV_2$ |
| ⋮ | ⋮ | ⋮ | ⋮ |
| #N-1 | $TL_{N-1}$ | $TD_{N-1}$ | $TV_{N-1}$ |
| #N | $TL_N$ | $TD_N$ | $TV_N$ |

FIG.7A

| CHANNEL ID | USED / UNUSED FLAG | PRIORITY LEVEL TABLE | | |
|---|---|---|---|---|
| | | #1 | --- | #N |
| $ch_1$ | 0 | $P_{1,1}$ | --- | $P_{N,1}$ |
| $ch_2$ | 1 | $P_{1,2}$ | --- | $P_{N,2}$ |
| ⋮ | ⋮ | ⋮ | ⋮ | ⋮ |
| $ch_{M-1}$ | 0 | $P_{1,M-1}$ | --- | $P_{N,M-1}$ |
| $ch_M$ | 0 | $P_{1,M}$ | --- | $P_{N,M}$ |

FIG.7B

| PRIORITY LEVEL TABLE NUMBER | DISTANCE THRESHOLD | MOVING DIRECTION THRESHOLD | MOVING SPEED THRESHOLD |
|---|---|---|---|
| #1 | $TL_1$ | $TD_1$ | $TV_1$ |
| #2 | $TL_2$ | $TD_2$ | $TV_2$ |
| | ⋮ | ⋮ | ⋮ |
| #N-1 | $TL_{N-1}$ | $TD_{N-1}$ | $TV_{N-1}$ |
| #N | $TL_N$ | $TD_N$ | $TV_N$ |

FIG.18

1ST MEMORY

| CHANNEL ID | USED/ UNUSED FLAG | GROUP ID | DISTANCE THRESHOLD | MOVING DIRECTION THRESHOLD | MOVING SPEED THRESHOLD |
|---|---|---|---|---|---|
| $ch_1$ | 0 | #1 | $TL_1$ | $TD_1$ | $TV_1$ |
| $ch_2$ | 1 | #2 | $TL_2$ | $TD_2$ | $TV_2$ |
| -- | -- | -- | -- | -- | -- |
| $ch_{W-1}$ | 0 | #N-1 | $TL_{N-1}$ | $TD_{N-1}$ | $TV_{N-1}$ |
| $ch_W$ | 0 | #N | $TL_N$ | $TD_N$ | $TV_N$ |

| 2ND MEMORY | | | | | |
|---|---|---|---|---|---|
| DISTANCE DATA TABLE | $L_1$ | $L_2$ | $L_3$ | ---- | $L_X$ |
| MOVING DIRECTION DATA TABLE | $D_1$ | $D_2$ | $D_3$ | ---- | $D_X$ |
| MOVING SPEED DATA TABLE | $V_1$ | $V_2$ | $V_3$ | ---- | $V_X$ |
| GROUP SIZES FOR GROUPING BY DISTANCES | $PL_1$ | $PL_2$ | | ---- | $PL_T$ |
| GROUP SIZES FOR GROUPING BY MOVING DIRECTIONS | $PD_1$ | $PD_2$ | | ---- | $PD_S$ |
| GROUP SIZES FOR GROUPING BY MOVING SPEEDS | $PV_1$ | $PV_2$ | | ---- | $PV_t$ |

MOBILE COMMUNICATION SYSTEM WITH AUTONOMOUS DISTRIBUTED TYPE DYNAMIC CHANNEL ALLOCATION SCHEME

BACKGROUND OF THE INVENTION

1. Field of the Invention

The present invention relates to a mobile communication system formed by base stations and mobile stations, and more particularly, to a channel allocation scheme used by each base station in establishing communications with mobile stations.

2. Description of the Background Art

A well known type of the mobile communication system currently in practical use as a portable telephone system or an automobile telephone system is a cellular system in which a communication service is provided by distributing a number of base stations over its service area, where each base station serves for a radio zone with a radius of about several km.

In general, in order to utilize a finite amount of available radio channel resources efficiently, this type of a mobile communication system adopts the geographically repeated utilization of the radio channels in which the identical radio channel is used by more than one geographically distanced base stations. In this case, by making a channel reuse distance between the base stations which uses the identical radio channel as small as possible, the higher frequency utilization efficiency can be achieved, so that the system capacity can be increased within a condition of a constant frequency bandwidth given to the system.

However, this channel reuse distance cannot be made unlimitedly smaller, because when this channel reuse distance is made smaller, there arises a problem of the interference from the identical radio channel or the interference from the neighboring radio channel in a case of an interleave scheme in which each radio channels are formed by allowing overlaps in the power at the side band of each radio channel in an FDMA (Frequency Division Multiple Access) system, which significantly lowers a communication quality. For this reason, there is a need to restrict the repeated utilization of the identical radio channel only among those base stations which are sufficiently distanced spatially to keep the interference within a certain tolerable level.

The schemes for realizing this repeated utilization of the radio channels within such a practical condition include a fixed channel allocation scheme and a dynamic channel allocation scheme, of which the dynamic channel allocation scheme further includes a centralized control type dynamic channel allocation scheme in which a control station for controlling the channel allocations is provided with respect to a plurality of base stations, and an autonomous distributed type dynamic channel allocation scheme in which each base station allocates the radio channels autonomously and distributedly.

The fixed channel allocation scheme fixedly allocates the radio channels to each base station according to the radio wave propagation state and the traffic distribution within the service area obtained either by the actual measurements or by the theoretical calculations. In general, this fixed channel allocation scheme is associated with problems that an enormous amount of efforts are required in obtaining a design for determining the fixed allocations, and that the re-designing is required at a time of the system expansion such as the addition of base stations, so that it has a very low adaptivity to a system expansion. In addition, the available radio channels of the entire system are to be divided into some number of groups and allocated to a number of base stations, so that there is a loss of efficiency of large groups, and therefore it cannot achieve the high frequency utilization efficiency.

On the other hand, in the dynamic channel allocation scheme, it is possible to allocate the radio channels flexibly to some extent in accordance with the temporal variation and the spatial bias of the traffic, and all the available radio channels of the entire system are made to be usable by any base station of the system, so that the large grouping effect can be obtained, and consequently the frequency utilization efficiency can be improved compared with the fixed channel allocation scheme.

However, in order to suppress the call loss rate or the interference probability to the minimum level, an enormous amount of data and quite complicated controls are necessary in general, and in a case of the centralized control type dynamic channel allocation scheme, it requires a considerable amount of signal traffic between each base station and the control station, while in a case of the autonomous distributed type dynamic channel allocation scheme; it requires many processing steps before the actual channel allocation can be made so that the connection delay becomes large. Thus, in the dynamic channel allocation scheme, how to realize a channel allocation scheme capable of achieving a less control load and a higher frequency utilization efficiency at the same time presents an important practical issue to be resolved.

To this end, there has been a proposition of a channel allocation scheme for realizing such an autonomous distributed type dynamic channel allocation by a relatively simple control method, as disclosed in Japanese Patent Application No. 61-244137 (1986) and Japanese Patent Application No. 62-91033 (1967).

In this channel allocation scheme, an allocation priority level of each radio channel is calculated from the past records of the channel use, i.e., records concerning whether each radio channel had allocated or not in the past, and the judgement as to whether each radio channel is to be allocated or not is made sequentially from a radio channel with a highest allocation priority level. Then, when it is judged to be allocated, the allocation of that radio channel is made accordingly, whereas otherwise the judgement for a next radio channel with a next highest allocation priority level is made.

More specifically, the aforementioned Japanese Patent Application No. 61-244137 proposed a radio communication scheme in which each channel is given a priority level which is dynamically determined according to the past records of the channel use and the channels are sequentially used in an order of their priority levels. On the other hand, the aforementioned Japanese Patent Application No. 62-91033 proposed a transmission channel control scheme in which a transmission success rate for each channel is memorized and the channels are sequentially used in an order of their transmission success rates at a time of transmission, while the transmission success rates are updated according to the transmission result.

However, in such a conventional autonomous distributed type dynamic channel allocation scheme, the allocation priority level of each radio channel has been determined by equally weighting all the past records of the channel use, and using a large number of the past records of the channel use, so that there has been a problem that an enormous amount of time is required in order to follow the changes in the radio wave propagation state and the traffic distribution after the system has reached a stationary state.

Here, the changes in the radio wave propagation state and the traffic distribution are caused by newly constructed buildings in the surrounding of each base station, newly constructed base stations, and/or the starting/ending of the operations of movable type base stations, and the conventional autonomous distributed type dynamic channel allocation scheme using the past records of the channel use has been unable to follow such changes of the radio wave propagation state and the traffic distribution, so that there has been problems of large call loss rate, interference probability, and connection delay.

Moreover, in such a conventional autonomous distributed type dynamic channel allocation scheme which calculates the allocation priority level of each radio channel according to the past records of channel use and makes the radio channel allocation according to the calculated allocation priority levels, only one priority level has been assigned to each radio channel, so that the repeated utilization of each radio channel is limited to the repeated utilization in units of the radio zones. As a result, the advantage in the frequency utilization efficiency in comparison with the fixed channel allocation scheme has been limited only to the improvement due to the large grouping effect obtained as all the available radio channels of the entire system are made to be usable by any base station of the system.

There has also been a proposition of a channel allocation scheme for realizing an autonomous distributed type dynamic channel allocation by a relatively small control load, as disclosed in Japanese Patent Application No. 1-306417 (1989).

In this channel allocation scheme, all the radio communication channels are divided into a plurality of channel groups, and in order to use these channel groups in accordance with the reception level in the communication, a lower limit of the reception level required in the communication between the mobile station and the base station using a channel of each channel group is set for each channel group. Then, a radio communication channel to be allocated to a communication set up request occurring in each radio zone is selected to be a channel of the channel group for which the reception level in the communication obtained from the reception level in the radio control channel between the requesting mobile station and the base station satisfies the aforementioned lower limit while the carrier to interference power ratio satisfies the required communication quality condition when this channel is allocated for setting up the requested communication.

However, in this conventional autonomous distributed type dynamic channel allocation scheme, it is necessary to determine thresholds to be used in determining the grouping of different channel groups by means of the thoroughly analysis of the radio wave propagation state and the traffic distribution within each radio zone using the actual measurements or the theoretical calculations, in order to suppress the control load required in the radio channel allocation at the minimum level, to maintain the high frequency utilization efficiency, and to satisfy the required communication quality.

But, such a thorough analysis over all the numerous radio zones existing within the service area of the system requires an enormous amount of time and efforts, and there is also a problem that the re-designing is necessary at a time of the system expansion such as the addition of base stations.

Moreover, apart from the system expansion, a large variation in the radio wave propagation state and the traffic distribution can be caused by new construction and destruction of buildings, roads, etc. in the surrounding of each base station, so that the re-designing is necessary in order to cope with such a variation.

SUMMARY OF THE INVENTION

It is therefore an object of the present invention to provide a mobile communication system and a channel allocation scheme adaptive to the system expansion and having a superior load variation follow-up characteristic, such that the degradation of the call loss rate, the interference probability, and the connection delay can be prevented regardless of the practically unavoidable changes in the radio wave propagation state and the traffic distribution caused by newly constructed buildings in the surrounding of each base station, newly constructed base stations, and/or the starting/ending of the operations of movable type bake stations.

It is another object of the present invention to provide a mobile communication system and a dynamic channel allocation scheme of an autonomous distribution type capable of reducing the control load and improving the frequency utilization efficiency.

It is another object of the present invention to provide a mobile communication system and a channel allocation scheme in which each base station can determine thresholds to be used in determining the grouping by its own autonomous processing, without requiring a cumbersome designing which takes enormous amounts of efforts and time.

According to one aspect of the present invention there is provided a method of allocating radio channels to communications between base stations and mobile stations in a mobile communication system, comprising the steps of: (a) managing allocation priority levels for the radio channels available in the mobile communication system, according to past records of channel use for each radio channel at each base station; (b) sequentially selecting each currently unused radio channel in an order of the allocation priority levels managed at the step (a), and sequentially making an allocation accept/reject judgement concerning whether each selected radio channel is usable or not, at said each base station; (c) updating the allocation priority level managed at the step (a) of each radio channel selected at the step (b) by weighting past allocation accept/reject judgement results for said each radio channel with weight factors which vary according to time intervals of the past allocation accept/ reject judgement results from a current time; and (d) allocating one radio channel which is judged as usable at the step (b) to a communication between said each base station and one mobile station.

According to another aspect of the present invention there is provided a method of allocating radio channels to communications between base stations and mobile stations in a mobile communication system, comprising the steps of: (a) grouping the mobile stations into N groups according to states of the mobile stations at each base station, where N is an integer; (b) managing N sets of allocation priority levels for each radio channel available in the mobile communication system in correspondence to said N groups at each base station; (c) for each mobile station, sequentially selecting each radio channel which is currently unused in an order of one of said N sets of the allocation priority levels managed at the step (b) which corresponds to one of said N groups grouped at the step (a) to which said each mobile station belongs to, and sequentially making an allocation accept/ reject judgement concerning whether each selected radio channel is usable or not, at said each base station; and (d) allocating one radio channel which is judged as usable at the step (c) to a communication between said each base station and said each mobile station.

According to another aspect of the present invention there is provided a method of allocating radio channels to communications between base stations and mobile stations in a mobile communication system, comprising the steps of: (a) determining thresholds for grouping the mobile stations according to past records of states of the mobile stations; (b) grouping the mobile stations into N groups at each base station according to the thresholds for grouping determined at the step (a), where N is an integer; (c) for each mobile station, sequentially selecting each radio channel which is currently unused and sequentially making an allocation accept/reject judgement concerning whether each selected radio channel is usable or not, at said each base station, according to a procedure prescribed for one of said N groups to which said each mobile station belongs to; and (d) allocating one radio channel which is judged as usable at the step (c) to a communication between said each base station and said each mobile station.

According to another aspect of the present invention there is provided a mobile communication system, comprising: mobile stations; and base stations for communicating with the mobile stations by allocating radio channels, each base station including: a memory for managing allocation priority levels for the radio channels available in the mobile communication system, according to past records of channel use for each radio channel; and control means for sequentially selecting each currently unused radio channel in an order of the allocation priority levels managed in the memory and sequentially making an allocation accept/reject judgement concerning whether each selected radio channel is usable or not so as to allocate one radio channel which is judged as usable to a communication between said each base station and one mobile station, and updating the allocation priority level of each selected radio channel in the memory by weighting past allocation accept/reject judgement results for said each radio channel with weight factors which vary according to time intervals of the past allocation accept/ reject judgement results from a current time.

According to another aspect of the present invention there is provided a mobile communication system, comprising: mobile stations; and base stations for communicating with the mobile stations by allocating radio channels, each base station including: a memory for managing N sets of allocation priority levels for each radio channel available in the mobile communication system in correspondence to N groups into which the mobile stations are grouped according to states of the mobile stations, where N is an integer; and control means for sequentially selecting each radio channel which is currently unused, for each mobile station, in an order of one of said N sets of the allocation priority levels managed in the memory which corresponds to one of said N groups to which said each mobile station belongs to, and sequentially making an allocation accept/reject judgement concerning whether each selected radio channel is usable or not, so as to allocate one radio channel which is judged as usable to a communication between said each base station and said each mobile station.

According to another aspect of the present invention there is provided a mobile communication system, comprising: mobile stations; and base stations for communicating with the mobile stations by allocating radio channels, each base station including: memory for managing thresholds for grouping the mobile stations according to past records of states of the mobile stations, such that the mobile stations are grouped into N groups according to the thresholds for grouping, where N is an integer; and control means for sequentially selecting each radio channel which is currently unused and sequentially making an allocation accept/reject judgement concerning whether each selected radio channel is usable or not, for each mobile station, according to a procedure prescribed for one of said N groups to which said each mobile station belongs to, so as to allocate one radio channel which is judged as usable to a communication between said each base station and said each mobile station.

Other features and advantages of the present invention will become apparent from the following description taken in conjunction with the accompanying drawings.

BRIEF DESCRIPTION OF THE DRAWINGS

FIGS. 7A and 7B are diagrammatic illustrations of data contents stored in a memory of the base station of FIG. 6.

FIG. 18 is a diagrammatic illustration of data contents stored in a first memory of the base station of FIG. 17.

FIG. 26 is a diagrammatic illustration of data contents stored in a second memory of the base station of FIG. 17 in one possible variation of the fourth embodiment of the present invention.

DETAILED DESCRIPTION OF THE PREFERRED EMBODIMENTS

Now, the first embodiment of a mobile communication system and a channel allocation scheme according to the present invention will be described.

Figure 1:
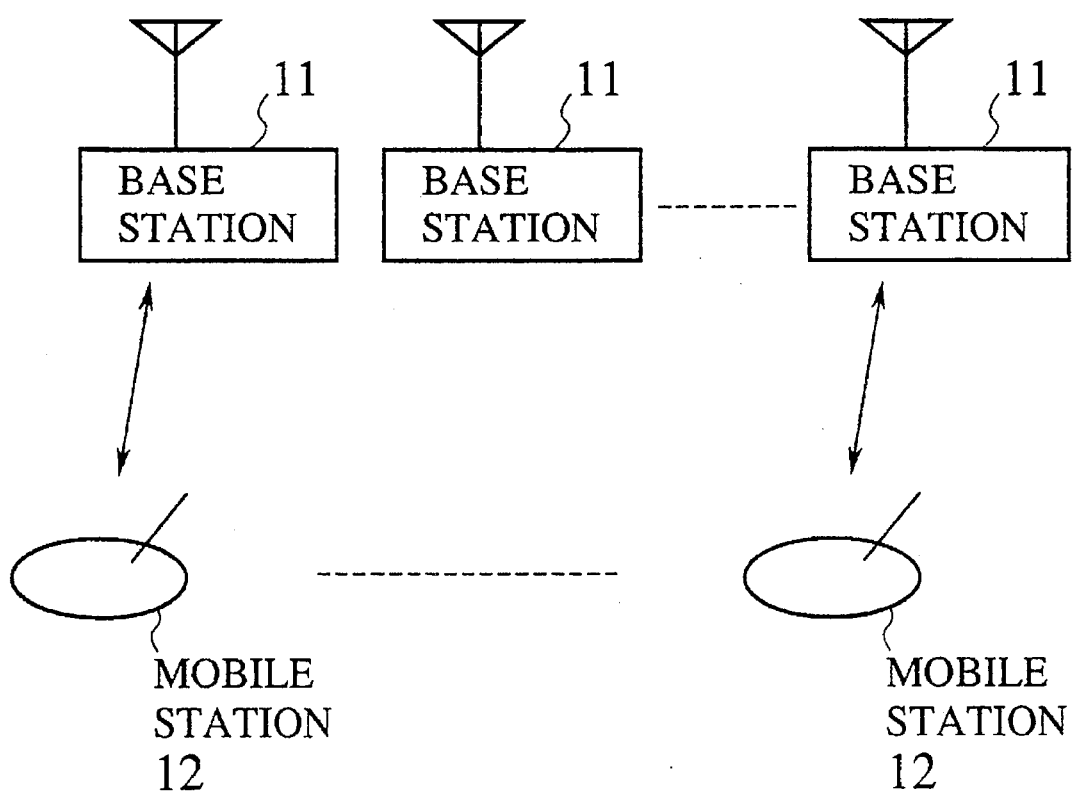
FIG. 1 is a schematic diagram showing an overall configuration of a mobile communication system according to the present invention.

In this first embodiment, the mobile communication system has an overall configuration as shown in FIG. 1 which comprises a plurality of base stations 11 distributed over an entire service area of this mobile communication system, and a number of mobile stations 12 moving within the service area. Here, total M radio channels (M is an integer) are available for this mobile communication system as a whole, and an i-th base station 11 is equipped with $K_i$ sets ($K_i$ is an integer) of transceiver devices capable of radio transmission and reception through any one of the M radio channels given to this mobile communication system, while each mobile station 12 is also equipped with a transceiver device capable of radio transmission and reception through any one of the M radio channels.

Figure 2:
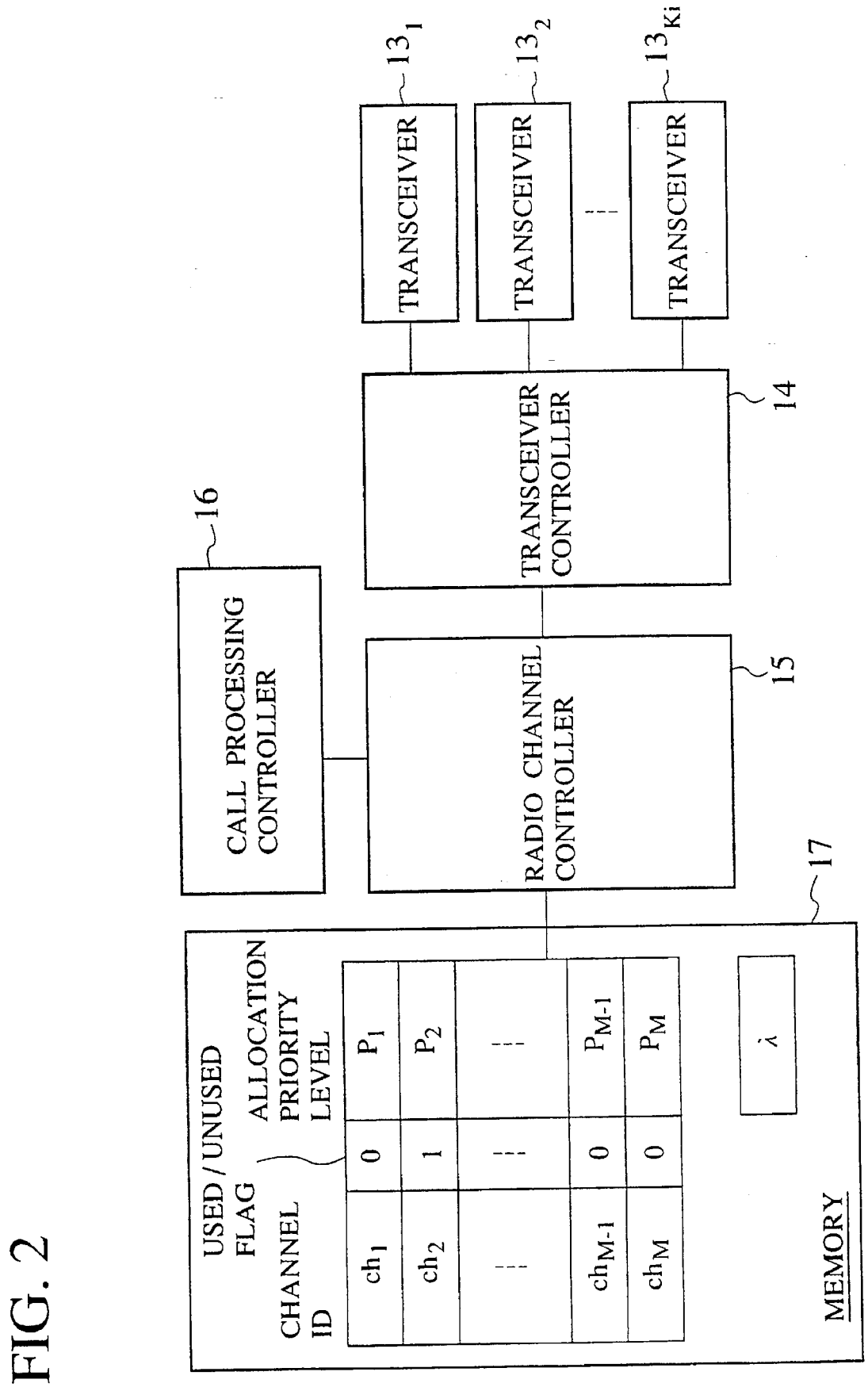
FIG. 2 is a block diagram showing a functional configuration relating to the radio channel allocation of a base station in the first embodiment of the present invention.

Here, each base station 11 has a functional configuration relating to the radio channel allocation as shown in FIG. 2, which includes total Ki sets of transceivers 13 ($13_1$ to $13_{Ki}$), a transceiver controller 14 connected with the transceivers 13, a radio channel controller 15 connected with the transceiver controller 14, a call processing controller 16 connected with the radio channel controller 15, and a memory 17 connected with the radio channel controller 15.

The memory 17 is used for managing allocation priority levels of the radio channels, and stores a predetermined weight constant $\lambda$ ($0 \leq \lambda < 1$) given by a system operator, and a table of a channel ID ($ch_1$ to $ch_M$) of each radio channel, a used/unused flag indicating whether each radio channel is currently used or unused, and an allocation priority level assigned to each radio channel, as shown in FIG. 2.

The radio channel controller 15 carries out reading, updating, and writing of the allocation priority level of a radio channel stored in the memory 17 and specified by a request from the call processing controller 16, and manages the radio channel currently used by each base station. The transceiver controller 14 carries out a management of the transceivers $13_1$ to $13_{Ki}$, and makes an allocation accept/reject judgement for a radio channel specified from the radio channel controller 15.

Figure 3:
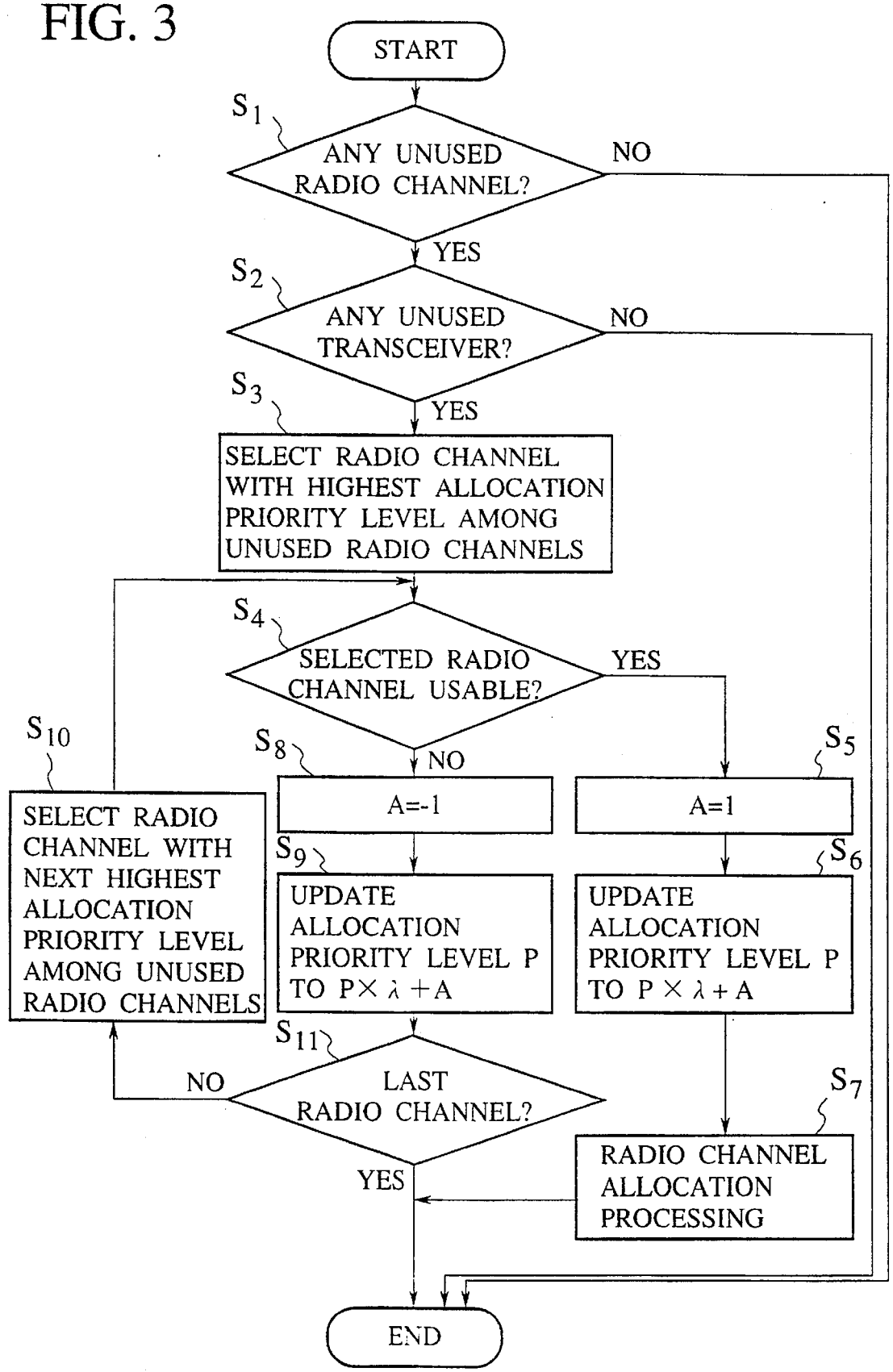
FIG. 3 is a flow chart for a radio channel allocation operation carried out by the base station of FIG. 2.

In this configuration of FIG. 2, the radio channel allocation operation is carried out according to the flow chart of FIG. 3 as follows.

When there is a radio channel allocation request with respect to a new call or a radio channel switching from the call processing controller 16, the radio channel controller 15 checks whether there exist radio channels which are currently unused or not, by reading the used/unused flags in the memory 17 (step S1). In a case all the radio channels $ch_1$ to $ch_M$ are currently used, this fact is notified to the call processing controller 18 and the operation is terminated.

In a case there exist radio channels which are currently unused, next the radio channel controller 15 inquires the transceiver controller 14 as to whether there exist transceivers 13 which are currently unused or not (step S2). In a case there is no transceiver 13 which is currently unused, the transceiver controller 14 notifies this fact to the call processing controller 16 through the radio channel controller 15 and the operation is terminated.

In a case there exist transceivers 13 which are currently unused, next the radio channel controller 15 selects a channel ID of one radio channel which has the highest allocation priority level among those radio channels which are currently unused, by referring to the allocation priority levels in the memory 17, and notifies the selected channel ID to the transceiver controller 14 (step S3).

In response, the transceiver controller 14 makes the allocation accept/reject judgement regarding whether the selected radio channel is usable or not as described in detail below, and returns the result of this allocation accept/reject judgement to the radio channel controller 15 (step S4).

Then, when the result of the allocation accept/reject judgement indicates that the selected radio channel is usable, the radio channel controller 15 sets a factor A to be used for updating the allocation priority level as one of the two values having opposite signs which are predetermined with respect to two possible results (accept and reject) of the allocation accept/reject judgement, which is +1 in this first embodiment (step S5), and then updates the allocation priority level $P_j$ of this selected radio channel according to the following formula (1):

$$P_j(new) = P_j(old) \times \lambda + A \qquad (1)$$

and writes this updated allocation priority level $P_j(new)$ into the corresponding entry of this selected radio channel in the memory 17 (step S6).

Then, the radio channel controller 15 notifies the channel ID of the selected radio channel to the call processing controller 16, and rewrites the used/unused flag in the corresponding entry of this selected radio channel in the memory 17 to "1" for indicating that it is currently used, so as to effectuate the radio channel allocation processing (step S7).

On the other hand, when the result of the allocation accept/reject judgement indicates that the selected radio channel is not usable, the radio channel controller 15 sets the factor A to as another one of the two values having opposite signs which are predetermined with respect to two possible results (accept and reject) of the allocation accept/reject judgement, which is −1 in this first embodiment, and then updates the allocation priority level $P_j$ of this selected radio channel according to the above formula (1) and writes this updated allocation priority level $P_j$(new) into the corresponding entry of this selected radio channel in the memory 17 (step S8).

Then, unless this selected radio channel is a last radio channel which are currently unused (step S11 NO), the radio channel controller 15 selects a channel ID of one radio channel which has the next highest allocation priority level among those radio channels which are currently unused, by referring to the allocation priority levels in the memory 17, and notifies this selected channel ID to the transceiver controller 14 (step S10), and the operation from the step S4 on as described above is repeated for this next selected radio channel.

In a case the result of the allocation accept/reject judgements for all the radio channels which are currently unused indicate that these radio channels are not usable as a result of repeated operation (step S11 YES), the radio channel controller 15 notifies this fact to the call processing controller 16, and the operation is terminated.

As a result of this operation, the allocation priority level $P_j$ of the j-th radio channel $ch_j$ is going to be updated as:

$$P_j = A_1 + \lambda A_2 + \lambda^2 A_3 + \ldots + \lambda^{(L-1)} A_L \quad (2)$$

according the allocation accept/reject judgement results $A_1$, $A_2$, ..., $A_L$ of the past L cases, where L is an integer and $A_i$ (i=1, 2, ..., L) has a value +1 or −1 as described above. Here, the weight constant $\lambda$ is a constant value in a range of $0 \leq \lambda < 1$, so that in this updated allocation priority level $P_j$, the contribution from the immediately previous allocation accept/reject judgement result is the largest, and the earlier allocation accept/reject judgement results have sequentially smaller contributions. Thus, in this first embodiment, it is possible to weight the past allocation accept/reject judgement results inversely proportional to the time order of these past allocation accept/reject judgement results by an extremely simple operation.

Moreover, in this first embodiment, it suffices for the memory 17 to have a sufficient memory capacity for storing the allocation priority levels, the radio channel utilization state (i.e., the used/unused flags), and a constant $\lambda$, so that this memory 17 can be formed by a relatively small capacity memory device suitable for high speed accesses.

In the above described radio channel allocation operation, the allocation accept/reject judgement of the selected radio channel at the step S4 can be made by various methods, such as a method in which the selected radio channel is tentatively set to one of the currently unused transceivers 13 and the radio signals are received at this transceiver 13 in order to determine the reception level (i.e., the interference level), and it is judged that the selected radio channel is usable when the determined reception level is less than or equal to a prescribed threshold, or a method in which the target mobile station is also notified to tentatively set the selected radio channel and the radio signals transmitted from the target mobile station through this selected radio channel is received at the base station in order to determine the carrier to interference power ratio for this selected radio channel, and it is judged that the selected radio channel is usable when the determined carrier to interference power ratio is greater than or equal to a prescribed threshold.

Now, the convergence of the allocation priority level $P_j$ when the allocation accept/reject judgement results with respect to the j-th radio channel happen to be either acceptances or rejections alone consecutively will be considered. Here, it is assumed that the allocation accept/reject judgement result which is an acceptance is represented by a value $A = \rho$, while the allocation accept/reject judgement result which is a rejection is represented by a value $A = -\rho$ (where $\rho$ is a positive constant), and the allocation priority level $P_j$ is to be sequentially updated according to the above formula (1).

When the acceptances occur consecutively for L times, the allocation priority level $P_j$ is given by:

$$P_j = \rho \sum_{n=1}^{L} \lambda^{n-1} \quad (3)$$

Then, using the following formula which holds for any number x in a range of −1<x<1:

$$\sum_{n=1}^{\infty} x^n = x/(1-x) \quad (4)$$

when the limit of the above expression (3) is taken, it follows that the limit of the allocation priority level $P_j$ is given by:

$$\rho \sum_{n=1}^{\infty} \lambda^{n-1} = \rho \{\lambda/(1-\lambda) + 1\} = \rho/(1-\lambda) \quad (5)$$

Similarly, when the rejections occur consecutively for L times, the limit of the allocation priority level $P_j$ is given by:

$$-\rho \sum_{n=1}^{\infty} \lambda^{n-1} = -\rho \{\lambda/(1-\lambda) + 1\} = -\rho/(1-\lambda) \quad (6)$$

Thus, the allocation priority level $P_j$ of this first embodiment converges to a finite value in either case. In other words, even when the allocation priority level for a certain radio channel happens to be the highest consecutively, this allocation priority level is not going to be infinitely large, and bounded by the finite value $\rho/(1-\lambda)$ as described above, so that a value of the allocation priority level never become so large as to overflow from the memory 17, as long as the memory 17 has a memory capacity sufficient for storing a value $\rho/(1-\lambda)$ at most.

As described, according to this first embodiment, the past allocation accept/reject judgement results are weighted inversely proportional to the time order of these past allocation accept/reject judgement results, i.e., the older allocation accept/reject judgement result is weighted by a smaller weight, so that even when the interference state changes as a result of the changes in the radio wave propagation state caused by newly constructed buildings in the surrounding of each base station, newly constructed base stations, and/or the starting/ending of the operations of movable type base stations, and/or the changes in the traffic distribution caused by the construction or destruction of a large building, it is possible to prevent the degradation of the connection quality such as the call loss rate, the interference probability, and the connection delay, as the allocation priority level of each radio channel also changes adaptively by following the environmental change to take a value suitable for the new environmental conditions.

In addition, in this first embodiment, it is possible to freely adjust the flexibility in the load variation follow-up characteristic with respect to the changes in the radio wave propagation state and the traffic distribution, by adjusting the value of the weight constant $\lambda$. Namely, by setting the weight constant $\lambda$ to be a smaller value, the decrease of the influence of the older allocation accept/reject judgement result on the allocation priority level can be made faster, such that the allocation priority level of each radio channel can be adapted to the changes in the radio wave propagation state and the traffic distribution more quickly, i.e., the flexibility of the load variation follow-up characteristic is raised. On the contrary, by setting the weight constant $\lambda$ to be a larger value, the influence of the older allocation accept/reject judgement result on the allocation priority level lasts longer, so that the flexibility of the load variation follow-up characteristic is reduced. Consequently, it is preferable to set the weight constant $\lambda$ to be relatively large when the changes in the radio wave propagation state and the traffic distribution are relatively small.

It is to be noted that, in this first embodiment, in calculating the allocation priority level according to the allocation accept/reject judgement result at a time of newly allocating the radio channel, when the interference occurs during the communication such that the switching of the communication to the other radio channel becomes necessary, it is also possible to account for the occurrence of the switching due to the interference as well. Namely, such an occurrence of the switching due to the interference can be accounted in updating the allocation priority level by the above formula (1) similarly as in a case of the allocation accept/reject judgement result which is the rejection, but using another value A such as $-0.5$ for instance.

Figure 4A:
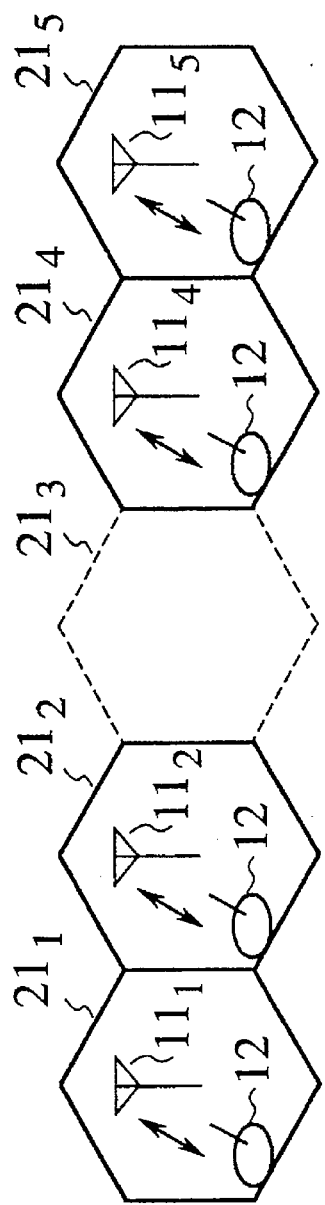
FIGS. 4A, 4B, and 4C are schematic diagrams of a computer simulation model of a mobile communication system used in confirming the effect of the first embodiment of the present invention.
Figure 4B:
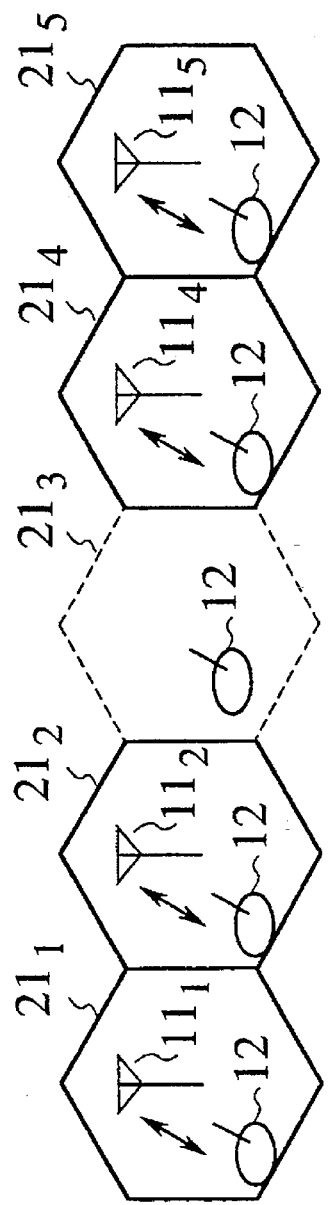
Figure 4C:
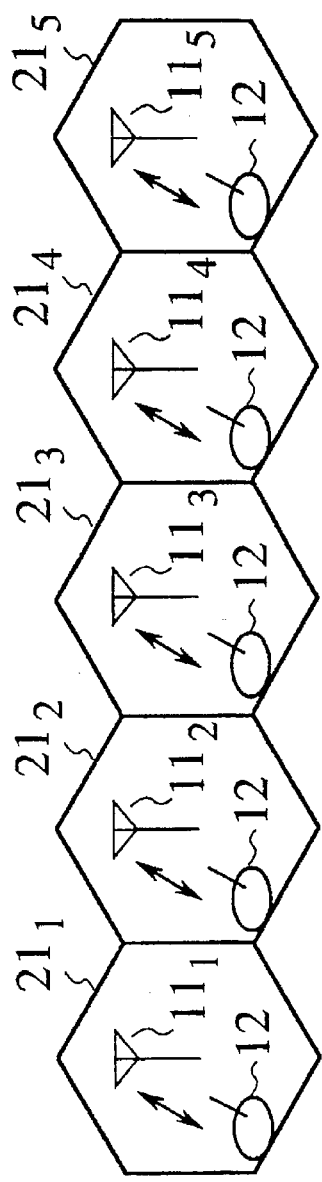

Now, the result of the computer simulation for confirming the effect of the above described first embodiment will be described. This computer simulation used a model as shown in FIGS. 4A to 4C in which radio zones $21_1$ to $21_5$ having respective base stations $11_1$ to $11_5$ are assumed to be in forms of hexagonal cells with omni-directional antennas which are arranged one dimensionally. In this model, the call is assumed to be generated according to the Poisson distribution, spatially uniformly throughout these radio zones, while the holding time is assumed to be in accordance with the exponential distribution with a mean equal to 120 sec., and the behavior of call within each radio zone is assumed to be identical. In addition, the mobile station which is going to make a call or receive a call is assumed to have selected the radio zone in advance by measuring the reception power of the perch channel (control channel) transmitted at the constant transmission power from the base station, while a number of radio channels available in the system as a whole is assumed to be 20, and only the identical channel interference is accounted as the interference.

In the practical mobile communication system, a frequently encountered situation is that, because of the increasing number of requests for making calls to or receiving calls from an area (region) for which the base station is not provided, it becomes necessary to provide a new base station in that area in order to facilitate the expanded service covering that area. In the above described computer simulation model, this situation is modelled as follows. As shown in FIG. 4A, for the first five days from the start of the simulation, the base station $11_3$ for the radio zone $21_3$ is absent and there is no call generated within this radio zone $21_3$. Then, as shown in FIG. 4B, from the sixth day to the tenth day of the simulation, the base station $11_3$ for the radio zone $21_3$ is still absent but the calls are generated in this radio zone $21_3$ just as in any other radio zone. Then, as shown in FIG. 4C, on the eleventh day of the simulation, the base station $11_3$ for the radio zone $21_3$ is newly provided to facilitate the expanded service covering this radio zone $21_3$.

Figure 5A:
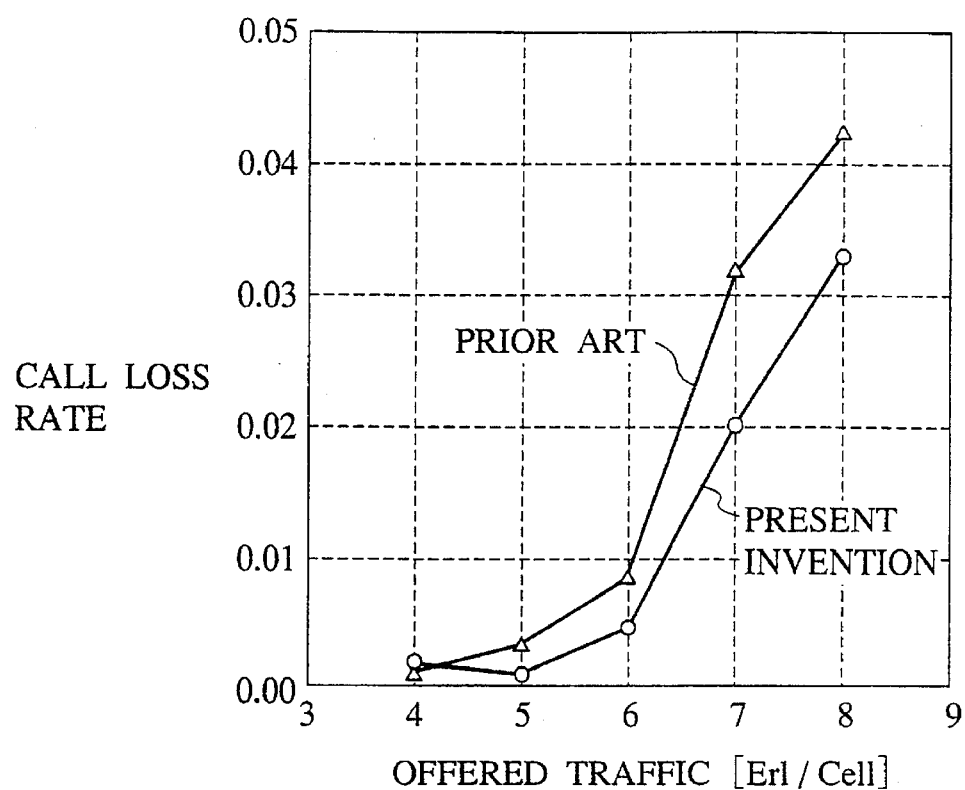
FIGS. 5A, 5B, 5C, and 5D are graphs showing results of the computer simulation using the computer simulation model of FIGS. 4A, 4B, and 4C.
Figure 5B:
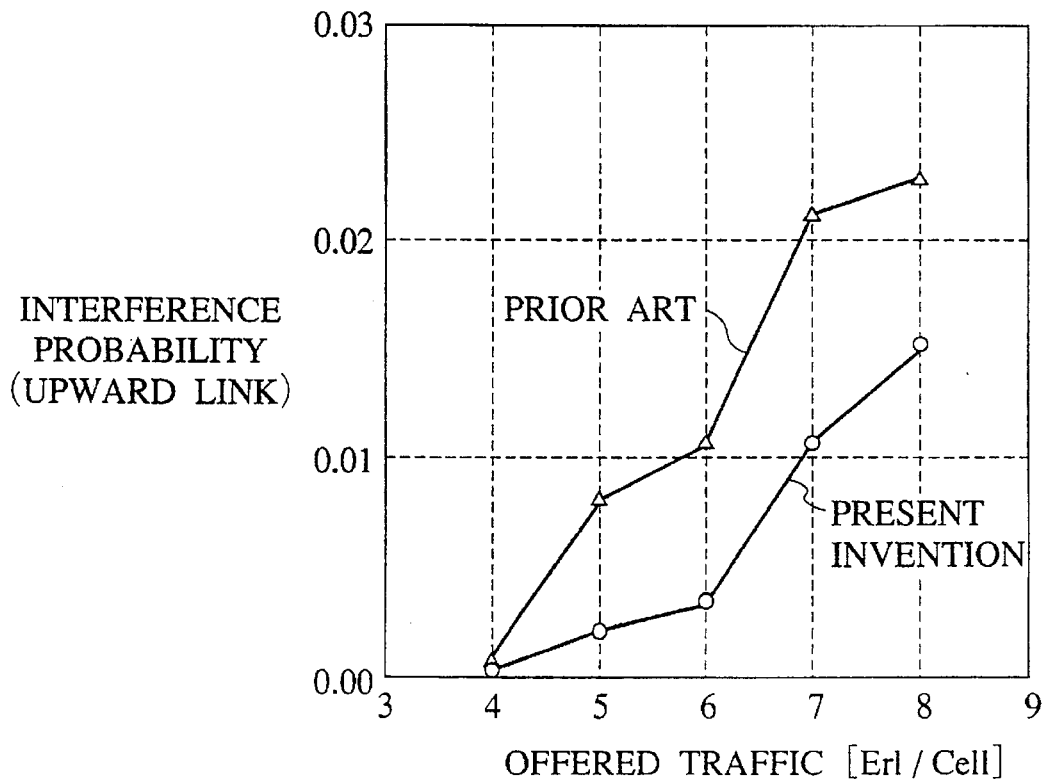
Figure 5C:
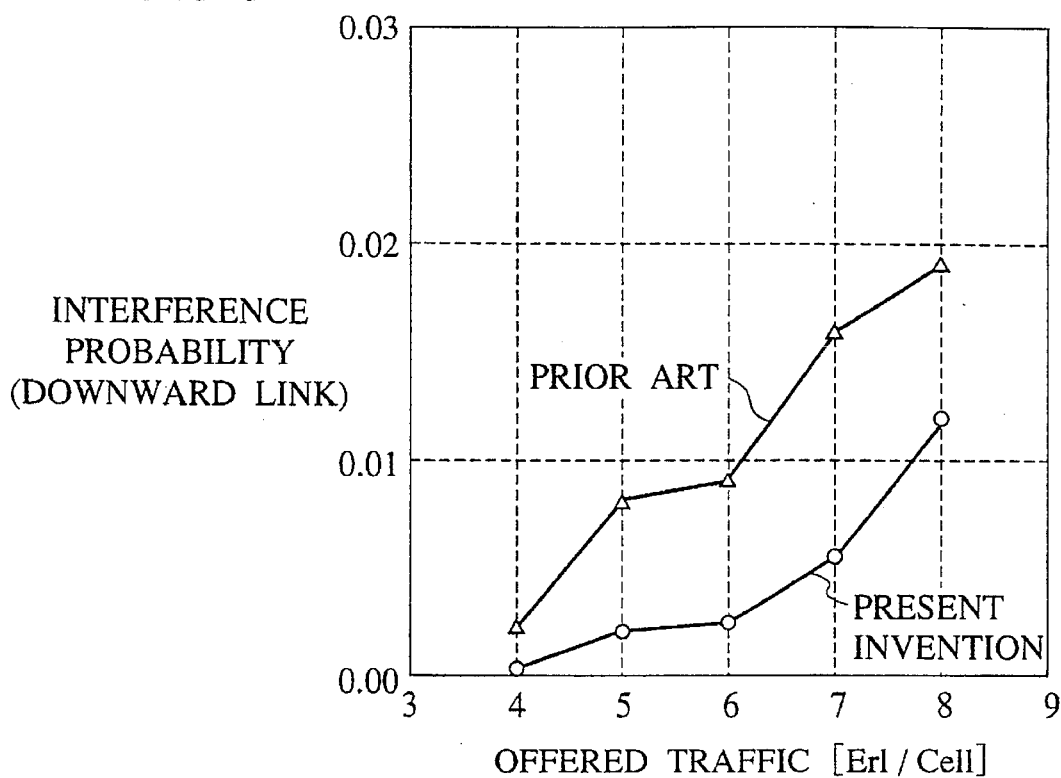
Figure 5D:
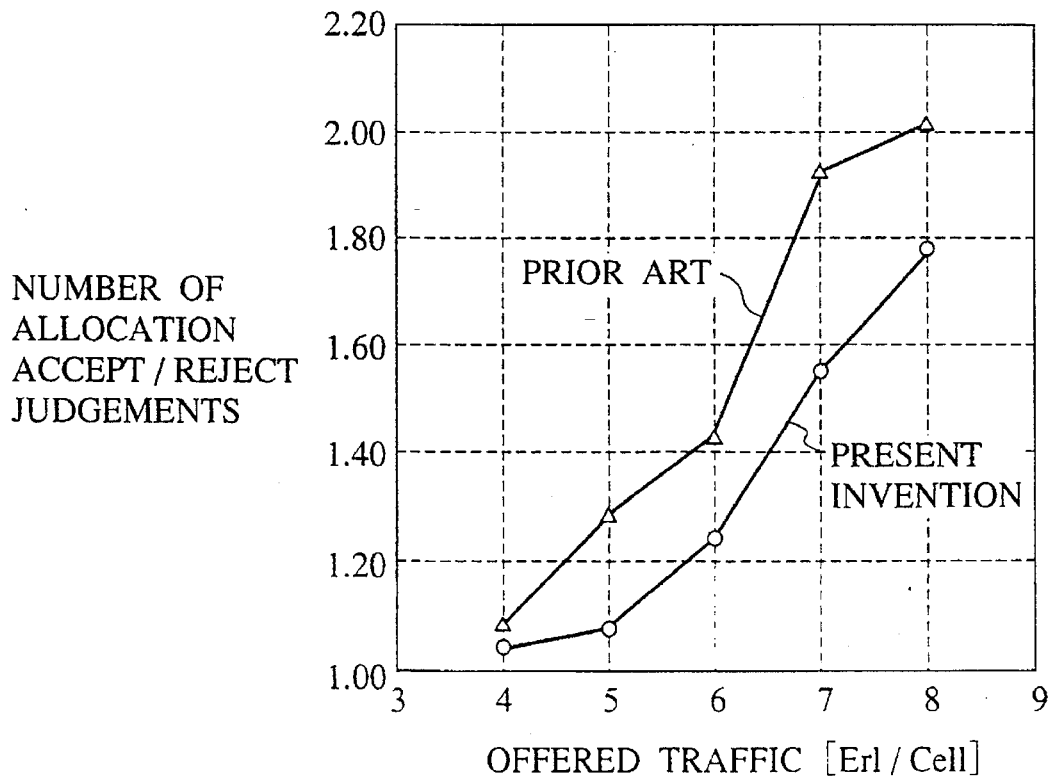

The result obtained by this computer simulation is indicated in FIGS. 5A to 5D, where FIG. 5A shows a call loss rate at the base station $11_3$ on the eleventh day of the simulation, FIGS. 5B and 5C show interference probabilities in the upward link (from the mobile station to the base station) and the downward link (from base station to the mobile station) for eleventh day of the simulation, respectively, and FIG. 5D shows a number of allocation accept/reject judgements required in making a radio channel allocation with respect to one call on the eleventh day of the simulation. In each of FIGS. 5A to 5D, the horizontal axis is set to be an offered traffic per one radio zone.

It can be seen from this computer simulation result that, in comparison with the conventional radio channel allocation scheme using the past records of the channel use, at a level of an offered traffic per one radio zone equal to 7 [Erl/Cell] for instance, the radio channel allocation scheme of this first embodiment can realize a considerable improvement of 2.02% for the call loss rate in contrast to conventional 3.13%, 1.05% for the interference probability in the upward link in contrast to conventional 2.11%, 0.54% for the interference probability in the downward link in contrast to conventional 1.6%, and 1.56 times for the number of allocation accept/reject judgements required in making a radio channel allocation with respect to one call in contrast to conventional 1.93 times.

Thus, it can be confirmed that the radio channel allocation scheme of this first embodiment is indeed capable of preventing the degradation of the connection quality such as the call loss rate, the interference probability, and the connection delay due to an increased number of allocation accept/reject judgements, and realizing the radio channel allocation with a small control load, even in a presence of the changes in the radio wave propagation state and the traffic distribution caused by newly constructed buildings in the surrounding of each base station, newly constructed base stations, and/or the starting/ending of the operations of movable type base stations.

It is to be noted here that the values of $A=1$ for a case of the allocation acceptance, $A=-1$ for a case of the allocation rejection, and $A=-0.5$ for a case of the channel switching due to the interference which are used in the above description are only exemplary values, and it basically suffices to use any positive value for a case of the allocation acceptance and any negative values for a case of the allocation rejection and a case of the channel switching due to the interference.

In particular, it is not necessary for the two values with opposite signs to be set in correspondence to the acceptance and the rejection to have an identical absolute value as in $A=\rho$ for the acceptance and $A=-\rho$ for the rejection as described above, and these two values may be set to have different absolute values. For example, it is possible to use a setting of $A=1.0$ for the allocation acceptance and $A=-1.2$ for the allocation rejection, such that when a new base station is provided in the surrounding of the old base station, the radio channels used at the old base station with high allocation priority levels become lower and it becomes easier to select the radio channels at the new base station. On the other hand, in a case of providing a plurality of base stations over a wide service area, and starting the service operation of all these base stations simultaneously from an initial state in which the allocation priority levels of all the radio channels are zeros, it is possible to use a setting of $A=1.2$ for the allocation acceptance and $A=-1.0$ for the allocation rejection, such that the allocation priority levels can reach high values quickly.

Moreover, a case of the channel switching due to the interference is handled similarly as in a case of the allocation rejection by using a value $A=-0.5$, i.e., a value with a smaller absolute value than a value $A=-1$ used in a case of the allocation rejection, in consideration for accounting the fact that the previous allocation priority level was high, but it is also possible to drop this consideration and use the same value $A=-1$ for both a case of the allocation rejection as well as a case of the channel switching due to the interference, if desired.

In addition, the weight for each allocation accept/reject judgement result is sequentially reduced as each allocation accept/reject judgement result becomes older with respect to the current allocation accept/reject judgement result in the above description, but it is not absolutely necessary to reduce this weight every time a new allocation accept/reject judgement result is made, and it may be modified such that this weight is reduced in every two or three times of making new allocation accept/reject judgement results, for example. In order to reduce this weight in every two times, it suffices to carry out the calculation of $P_i \times \lambda + A$ and the calculation of $P_i + A$ alternately in updating the allocation priority level $P_i$.

Moreover, instead of reducing the weight in every prescribed number of times, the number of times for which the identical weight is used can be increased for the older allocation accept/reject judgement result. It is also possible to use a certain weight for a prescribed number, such as three for instance, of the allocation accept/reject judgement results counted from the latest one, while using another smaller weight for all the allocation accept/reject judgment results older than these, i.e., to reduce the weight once at least as the allocation accept/reject judgement result becomes older. It is also possible to set the weight of the three times earlier allocation accept/reject judgement result as the maximum possible weight for the current allocation accept/reject judgement result in some cases, if desired.

As for the radio channels to be used in this first embodiment, it is possible to consider the use of the radio frequencies in the FDMA system, the use of the time slots in the TDMA (Time Division Multiple Access) system, and the repeated use of the spread codes or the frequency hopping patterns in the CDMA (Code Division Multiple Access) system, and the radio channel allocation scheme of this first embodiment is equally applicable to any of these cases, by making the allocation accept/reject judgement according to the measurement of the interference level or the carrier to interference power ratio as described above, for the substantially similar effects.

Now, the second embodiment of a mobile communication system and a channel allocation scheme according to the present invention will be described.

Figure 6:
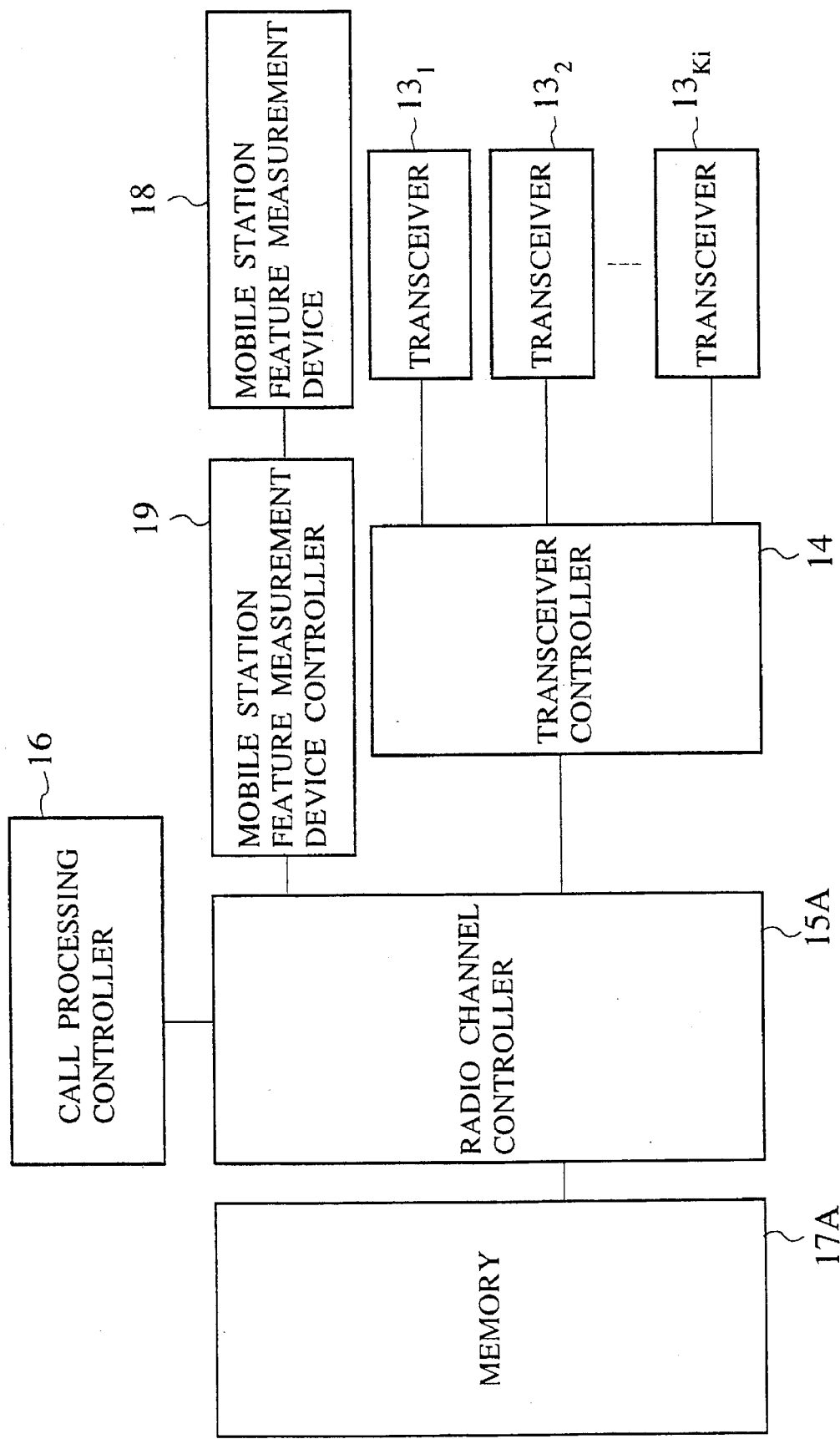
FIG. 6 is a block diagram showing a functional configuration relating to the radio channel allocation of a base station in the second embodiment of the present invention.

In this second embodiment, the mobile communication system has an overall configuration similar to that shown in FIG. 1 described above, where each base station 11 has a functional configuration relating to the radio channel allocation as shown in FIG. 6 which includes total Ki sets (Ki is an integer) of transceivers 13 ($13_1$ to $13_{Ki}$), a transceiver controller 14 connected with the transceivers 13, a radio channel controller 15A connected with the transceiver controller 14, a call processing controller 16 connected with the radio channel controller 15A, a memory 17A connected with the radio channel controller 15A, a mobile station feature measurement device 18 for measuring a feature of each mobile station, and a mobile station feature measurement device controller 19 connected with the mobile station feature measurement device 18 and the radio channel-controller 15A.

The radio channel controller 15A carries out reading, updating, and writing of the data stored in the memory 17A and specified by a request from the call processing controller 16, and manages the radio channel currently used by each base station. The transceiver controller 14 carries out a management of the transceivers $13_1$ to $13_{Ki}$, and makes an allocation accept/reject judgement for a radio channel specified from the radio channel controller 15A.

Here, the radio channels are allocated by dividing the mobile stations into a plurality of groups according to the features of the mobile stations such as the distances, the moving directions, and the moving speeds with respect to each base station. For this reason, the memory 17A is used for managing allocation priority levels of the radio channels, and stores a table of a channel ID ($ch_1$ to $ch_M$) of each radio channel, a used/unused flag indicating whether each radio channel is currently used or unused, and a priority level table registering N sets of allocation priority levels assigned to each radio channel, as shown in FIG. 7A, as well as a table of a priority level table number (#1 to #N) of each priority level table, and corresponding thresholds for the distance, the moving direction, and the moving speed to be used in dividing the mobile stations into N groups, as shown in FIG. 7B.

In this configuration of FIG. 6, the radio channel allocation operation is carried out according to the flow chart of FIG. 8 as follows.

When there is a radio channel allocation request with respect to a new call or a radio channel switching from the call processing controller 16, the radio channel controller 15A checks whether there exist radio channels which are currently unused or not, by reading the used/unused flags in the memory 17A (step 110). In a case all the radio channels $ch_1$ to $ch_M$ are currently used, this fact is notified to the call processing controller 16 and the operation is terminated.

In a case there exist radio channels which are currently unused, next the radio channel controller 15A inquires the transceiver controller 14 as to whether there exist transceivers 13 which are currently unused or not (step 120). In a case there is no transceiver 13 which is currently unused, the transceiver controller 14 notifies this fact to the call processing controller 16 through the radio channel controller 15A and the operation is terminated.

In a case there exist transceivers 13 which are currently unused, next the radio channel controller 15A commands the mobile station feature measurement device controller 19 to control the mobile station feature measurement device 18 such that the extraction of the features of the mobile station to which the radio channel is to be allocated such as the distance, the moving direction, and the moving speed is carried out by the mobile station feature measurement device 18 (step 130).

Then, the mobile station feature measurement device controller 19 notifies the measurement result received from the mobile station feature measurement device 18 to the radio channel controller 15A, and in response, the radio channel controller 15A compares the notified measurement result with the thresholds for determining the priority level table number stored in the memory 17A, so as to determine the appropriate priority level table number (step 140).

Then, the radio channel controller 15A selects a channel ID of one radio channel which has the highest allocation priority level among those radio channels which are currently unused by referring to the allocation priority level registered in the priority level table on the memory 17A which is specified by the priority level table number determined at the step 140, and notifies the selected channel ID to the transceiver controller 14 (step 150).

In response, the transceiver controller 14 makes the allocation accept/reject judgement regarding whether the selected radio channel is usable or not as described in detail below, and returns the result of this allocation accept/reject judgement to the radio channel controller 15A (step 160).

Then, when the result of the allocation accept/reject judgement indicates that the selected radio channel is usable, the radio channel controller 15A raises the allocation priority level with respect to the selected radio channel on that priority level table (step 170) so as to update the allocation priority level on the memory 17A, and then, the radio channel controller 15A notifies the channel ID of the selected radio channel to the call processing controller 16, and rewrites the used/unused flag in the corresponding entry of this selected radio channel in the memory 17A to "1" for indicating that it is currently used, so as to effectuate the radio channel allocation processing (step 175).

On the other hand, when the result of the allocation accept/reject judgement indicates that the selected radio channel is not usable, the radio channel controller 15A lowers the allocation priority level with respect to the selected radio channel on that priority level table (step 180) so as to update the allocation priority level on the memory 17A, and then, unless this selected radio channel is a last radio channel which are currently unused (step 190 NO), the radio channel controller 15A selects a channel ID of one radio channel which has the next highest allocation priority level among those radio channels which are currently unused, by referring to the allocation priority levels in the memory 17A, and notifies this selected channel ID to the transceiver controller 14 (step 200), and the operation from the step 160 on as described above is repeated for this next selected radio channel.

In a case the result of the allocation accept/reject judgements for all the radio channels which are currently unused indicate that these radio channels are not usable as a result of repeated operation (step 190 YES), the radio channel controller 15A notifies this fact to the call processing controller 18, and the operation is terminated.

By means of this radio channel allocation operation, it is possible to realize the separate use of the radio channels for different mobile stations within each base station automatically according to the features of the mobile stations, as well as the separate use of the radio channels among different base stations automatically, such that it is possible to realize the radio channel allocation scheme with high frequency utilization efficiency and communication quality by using a simple control.

In the above radio channel allocation operation, the allocation accept/reject judgement of the selected radio channel at the step 160 can be made by various methods, such as a method in which the selected radio channel is tentatively set to one of the currently unused transceivers 13 and the radio signals are received at this transceiver 13 in order to determine the reception level (i.e., the interference level), and it is judged that the selected radio channel is usable when the determined reception level is less than or equal to a prescribed threshold, a method in which the target mobile station is also notified to tentatively set the selected radio channel and the radio signals transmitted from the target mobile station through this selected radio channel is received at the base station in order to determine the carrier to interference power ratio for this selected radio channel, and it is judged that the selected radio channel is usable when the determined carrier to interference power ratio is greater than or equal to a prescribed threshold, or a method in which the target mobile station is also notified to tentatively set the selected radio channel and the interference level or the carrier to interference power ratio is also measured at the mobile station side, and it is judged that the selected radio channel is usable by comparing the determined interference level or the carrier to interference power ratio with predetermined threshold.

The threshold for the interference level or the carrier to interference power ratio to be used in this allocation accept/reject judgement of the selected radio channel at the step 160 may be set to be identical for all the groups, or to be different for each group. For example, the threshold for the carrier to interference power ratio can be set to have a smaller margin with respect to a desired value for the mobile station with slow moving speed as such a mobile station is expected to have a smaller variation in the communication state, and to have a larger margin with respect to the desired value for the mobile station with fast moving speed as such a mobile station is expected to have a larger variation in the communication state. Similarly, the threshold for the interference level can be set to have a larger value for the mobile station in a vicinity of the base station and to have a smaller value for the mobile station in a vicinity of a cell edge, so as to satisfy the required communication quality.

In the above radio channel allocation operation, the state of the mobile station is measured by the base station at a time of the radio channel allocation, but it is also possible to modify this aspect of the above radio channel allocation operation such that the measurement of the state of the mobile station is carried out by the mobile station itself. In such a case, it is possible to utilize a method in which the mobile station measures its own state in response to a command issued from the base station at a time of calling or call receiving, and reports the measured state to the base station, or a method in which the mobile station measures its own state autonomously at a time of calling or call receiving, or at a time of being in an idle state, and reports the measured state to the base station, for example. This second embodiment is equally applicable to either one of these methods, for essentially the similar effects.

Moreover, in the above radio channel allocation operation, the allocation priority level has been determined adaptively according to the allocation accept/reject judgement result for each group, but it is also possible to modify this aspect of the above radio channel allocation operation such that the allocation priority level is determined adaptively according to the allocation accept/reject judgement results for each group as well as other groups. For example, when the allocation accept/reject judgement result is the acceptance, the allocation priority level for that radio channel in that group is raised while the allocation priority levels of that radio channel in the other groups are lowered, such that the convergence time for the allocation priority level can be shortened.

Figure 9:
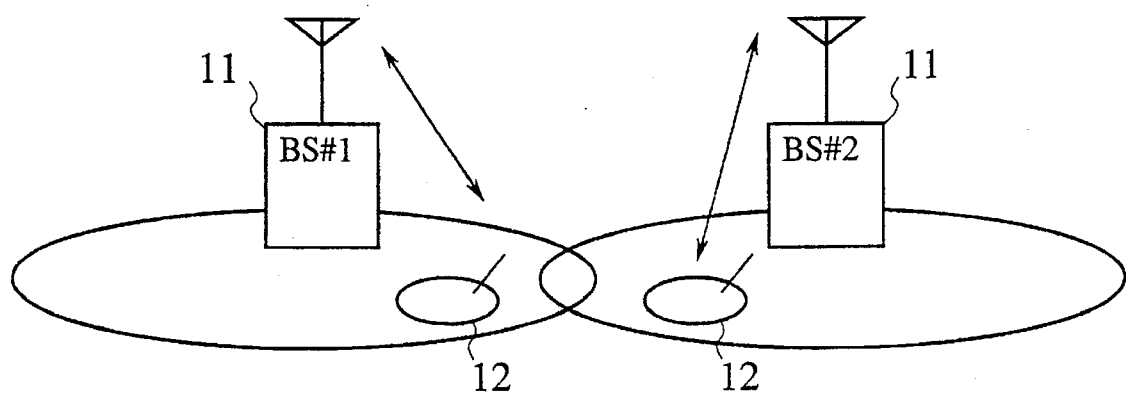
FIG. 9 is a schematic diagram of a computer simulation model of a mobile communication system for showing an exemplary allocation priority level for each group and each base station in the second embodiment of the present invention.

Now, an exemplary allocation priority level for each group and each base station will be explained according to the computer simulation result. This computer simulation concerns with an exemplary case of a system with two neighboring base stations 11 (BS#1 and BS#2) as shown in FIG. 9, where total five radio channels are available in the system as a whole. A number of priority level tables, i.e., a number of groups, is assumed to be three, and the grouping is made according to the distance from the base station 11 alone. Here, the distance of the mobile station 12 from the base station 11 is estimated by measuring the reception level at the base station 11 of the radio wave transmitted from the mobile station 12. Also, the call is assumed to be generated according to the Poisson distribution, spatially uniformly throughout the radio zones of these base stations 11, while the offered traffic is assumed to be identical in these two radio zones. Moreover, the allocation accept/reject judgement result is set to be the acceptance when the carrier to interference power ratios for the upward and downward links are greater than or equal to a prescribed threshold, and only the identical channel interference is accounted as the interference.

Figure 10A:
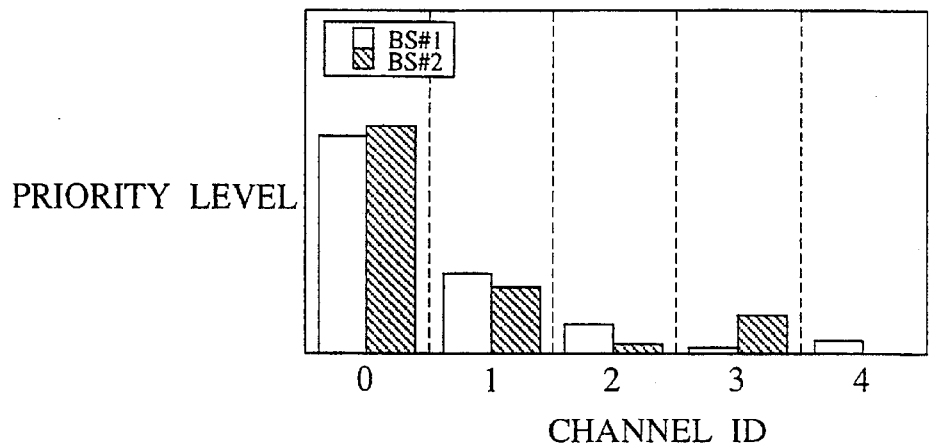
FIGS. 10A, 10B, and 10C are graphs showing allocation priority levels for three different groups obtained by the computer simulation using the computer simulation model of FIG. 9.
Figure 10B:
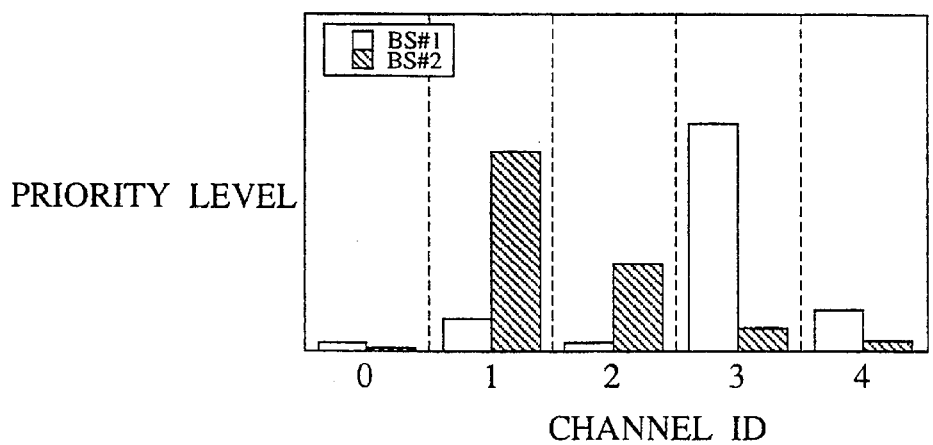
Figure 10C:
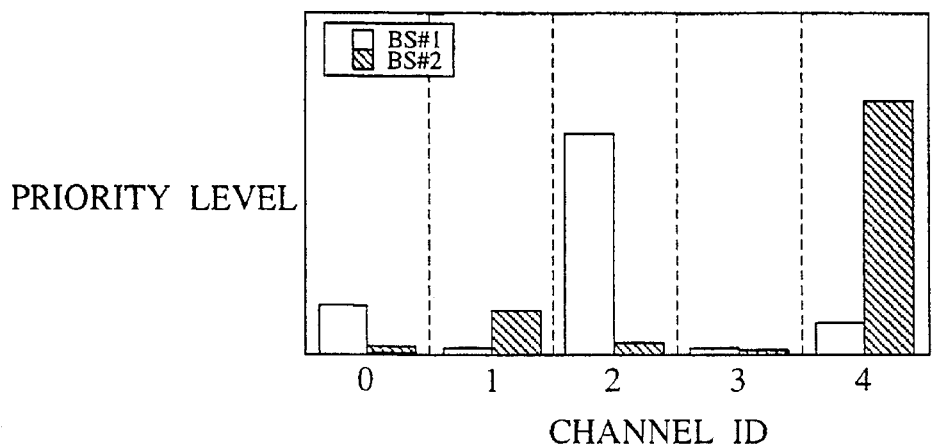

The allocation priority levels at both base stations BS#1 and BS#2 after a sufficient amount of time has elapsed since the start of the simulation are indicated in FIGS. 10A to 10C, where FIG. 10A shows the allocation priority levels of the priority level table #1, which are used for the mobile station at a close distance to the base station, FIG. 10B shows the allocation priority levels used for the mobile station at a middle range distance from the base station, and FIG. 10C shows the allocation priority levels used for the mobile station at a far distance from the base station. In these FIGS. 10A to 10C, the higher value along the vertical axis indicates the higher allocation priority level.

It can be seen that, in FIG. 10A, the channel #0 has the highest allocation priority level for both BS#1 and BS#2, so that the identical radio channel is used with the high allocation priority level in the neighboring radio zones for the mobile station at the close distance from the base station. On the other hand, in FIGS. 10B and 10C, the radio channels with the highest allocation priority level are different for BS#1 and BS#2. For example, in FIG. 10C, the radio channel #2 has the highest allocation priority level for BS#1 while the radio channel #4 has the highest allocation priority level for BS#2, such that the different radio channels are used in order to avoid the occurrence of the interference in each radio zone from the other radio zone.

It can also be seen that the separate use of the radio channels among the groups is realized automatically. For example, for BS#1, the radio channel #0 has the high allocation priority level in FIG. 10A while this radio channel #0 has low allocation priority levels in FIGS. 10B and 10C, whereas the radio channel #3 has the high allocation priority level in FIG. 10B while this radio channel #3 has low allocation priority levels in FIGS. 10A and 10C.

In general, for the mobile station which is far distanced from the base station and located near the edge of the radio zone, the carrier reception level is low for both upward and downward links, so that it is necessary for the radio channel to be allocated to such a mobile station to be utilized repeatedly over a relatively large distance in order to suppress the interference level from the other base station or mobile station in the surrounding to be low such that the degradation of the communication quality can be prevented. On the contrary, for the mobile station which is near the base station, the carrier reception level of a certain level can be secured so that there is no degradation of the communication quality due to the use of the radio channel with a relatively smaller channel reuse distance compared with a case of the mobile station located near the edge of the radio zone.

Consequently, by separately using the radio channel with a large channel reuse distance and the radio channel with a small channel reuse distance according to the distances between the base station and the mobile station, it is possible to improve the frequency utilization efficiency. In the radio channel allocation scheme of this second embodiment, the separate uses of the radio channels within the base station as well as among different base stations according to the features of the mobile stations are automatically realized by the autonomous distributed control at each base station, so that it is possible to realize the radio channel allocation scheme with high frequency utilization efficiency and communication quality by using a simple control.

Now, the result of the computer simulation for confirming the effect of the above described second embodiment will be described. This computer simulation used a model with a service area formed by 61 radio zones in forms of hexagonal cells with omni-directional antennas. In this model, the call is assumed to be generated according to the Poisson distribution, spatially uniformly throughout these radio zones, while the holding time is assumed to be in accordance with the exponential distribution with a mean equal to 120 sec., and the behavior of call within each radio zone is assumed to be identical. In addition, the mobile station which is going to make a call or receive a call is assumed to have selected the radio zone in advance by measuring the reception power of the perch channel (control channel) transmitted at the constant transmission power from the base station, while a number of radio channels available in the system as a whole is assumed to be 35, and only the identical channel interference is accounted as the interference. A number of priority level tables, i.e., a number of groups, is assumed to be seven, and the grouping is made according to the distance from the base station alone as the feature of the mobile station. Here, the distance of the mobile station from the base station is estimated by measuring the reception level at the base station of the radio wave transmitted from the mobile station. Moreover, the allocation accept/reject judgement result is set to be the acceptance when the carrier to interference power ratios for the upward and downward links are greater than or equal to a prescribed threshold.

Figure 11:
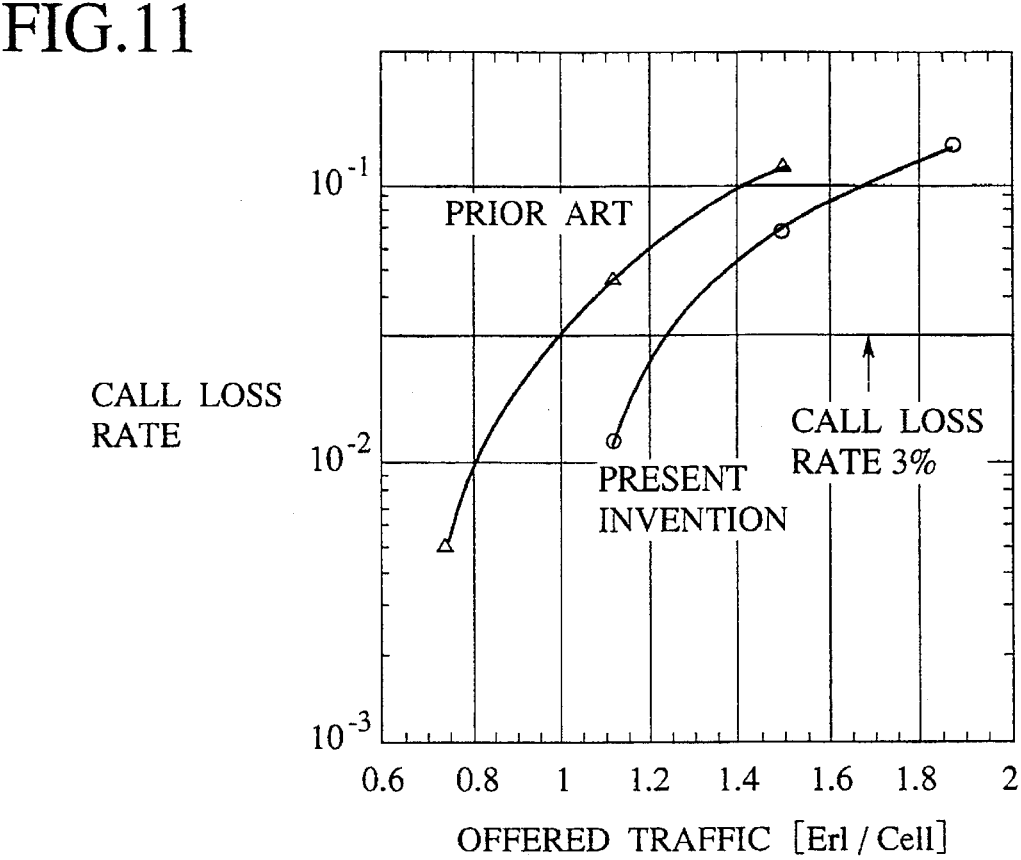
FIGS. 11 and 12 are graphs showing results of the computer simulation for confirming the effect of the second embodiment of the present invention.
Figure 12:
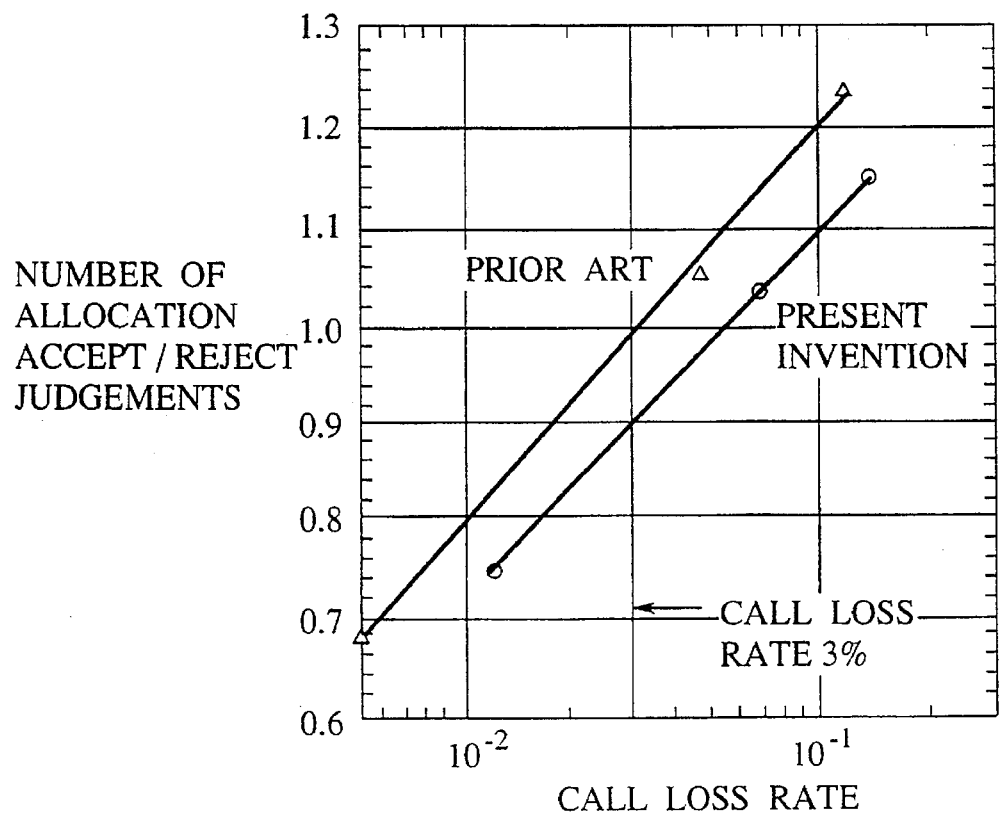

The result obtained by this computer simulation is indicated in FIGS. 11 and 12, where a system capacity is defined by an offered traffic per one radio zone at the call loss rate of 3%, and FIG. 11 shows a call loss rate as a function of the offered traffic per one radio zone which is normalized by the system capacity in the conventional radio channel allocation scheme using a single allocation priority level, while FIG. 12 shows a number of allocation accept/reject judgements required in making a radio channel allocation with respect to one call as a function of the call loss rate which is normalized by a number of allocation accept/reject judgements required in a case of the system capacity in the conventional radio channel allocation scheme.

It can be seen from this computer simulation result that, in comparison with the conventional radio channel allocation scheme using a single allocation priority level, the radio channel allocation scheme of this second embodiment can realize a considerable improvement of approximately 25% for the system capacity as well as a considerable reduction of approximately 10% for the number of allocation accept/reject judgements required in making a radio channel allocation with respect to one call in the system capacity.

Thus, it can be confirmed that the radio channel allocation scheme of this second embodiment is indeed capable of improving the system capacity considerably while suppressing the control load to be sufficiently small, so that it is possible to realize a mobile communication system and a dynamic channel allocation scheme of an autonomous distribution type with a reduced control load and the improved frequency utilization efficiency.

A case of using the moving direction and the moving speed of the mobile station as the features of the mobile station is similarly capable of achieving the similar effects by the similarly simple control.

It is to be noted here that, when the radio channel allocation is made without accounting for the moving direction and the moving speed of the mobile station, there is going to be a high probability for the occurrence of the forceful call disconnection due to the mobile station moving at the high speed which tends to move from one radio zone to another frequently such that the radio channel allocation at the moving target radio zone cannot follow the movement of the mobile station, and the control load for switching the radio channels is going to be increased on both the base station side as well as the mobile station side. Also, in such a case, due to the presence of the fast moving mobile station, the interference condition varies largely in time, such that a probability for the occurrence of the interference increases for the fast moving mobile station as well as for the slow moving mobile station. Consequently, in a case the mobile stations with different moving speeds coexists within the service area, it is necessary to separately use the radio channels according to the moving directions and the moving speeds of the mobile stations.

In the radio channel allocation scheme of this second embodiment, the mobile stations are divided into groups according to the moving directions and the moving speeds of the mobile stations, and the radio channels are allocated by using different allocation priority levels in correspondence to the different groups, so that the separate use of the radio channels can be realized automatically just as in a case of using the distance between the base station and the mobile station, and it is possible to suppress the control load as well as the lowering of the frequency utilization efficiency at the minimum levels.

As for the radio channels to be used in this second embodiment, it is possible to consider the use of the radio frequencies in the FDMA system, the use of the time slots in the TDMA system, and the repeated use of the spread codes or the frequency hopping patterns in the CDMA system, and the radio channel allocation scheme of this second embodiment is equally applicable to any of these cases, by making the allocation accept/reject judgement according to the measurement of the interference level or the carrier to interference power ratio as described above, for the substantially similar effects.

Now, the third embodiment of a mobile communication system and a channel allocation scheme according to the present invention will be described.

This third embodiment concerns with a modification of the second embodiment in that, instead of determining the allocation priority level adaptively according to the allocation accept/reject judgement result within each group, the allocation priority level is determined adaptively according to the past records of the channel use in each group as well as in the other groups.

Figure 8:
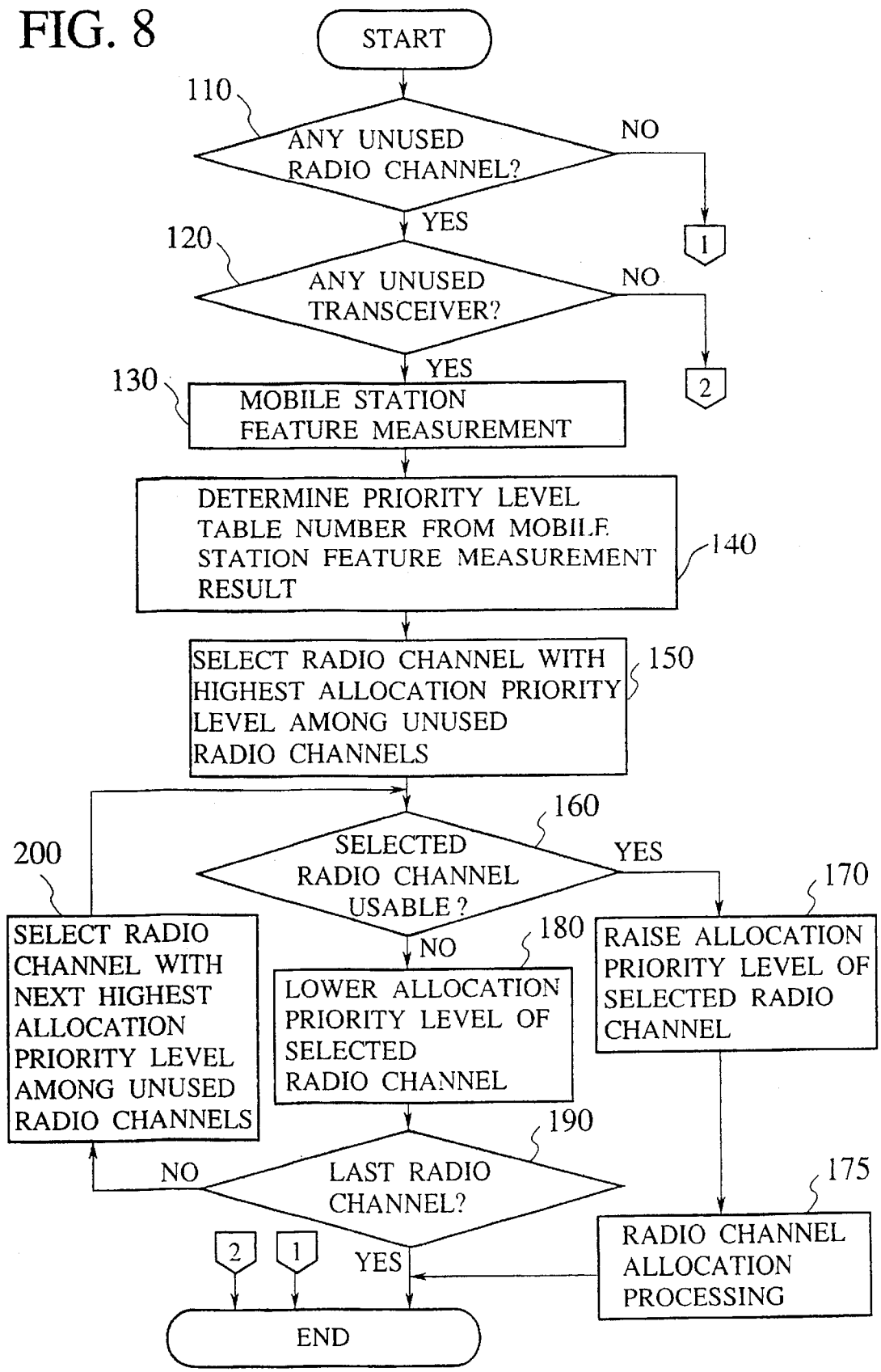
FIG. 8 is a flow chart for a radio channel allocation operation carried out by the base station of FIG. 6.

In this third embodiment, the mobile communication system has an overall configuration similar to that shown in FIG. 1 described above, and each base station 11 has a functional configuration relating to the radio channel allocation as shown in FIG. 8 described above, with the memory 17A storing the data as shown in FIGS. 7A and 7B described above.

Figure 13:
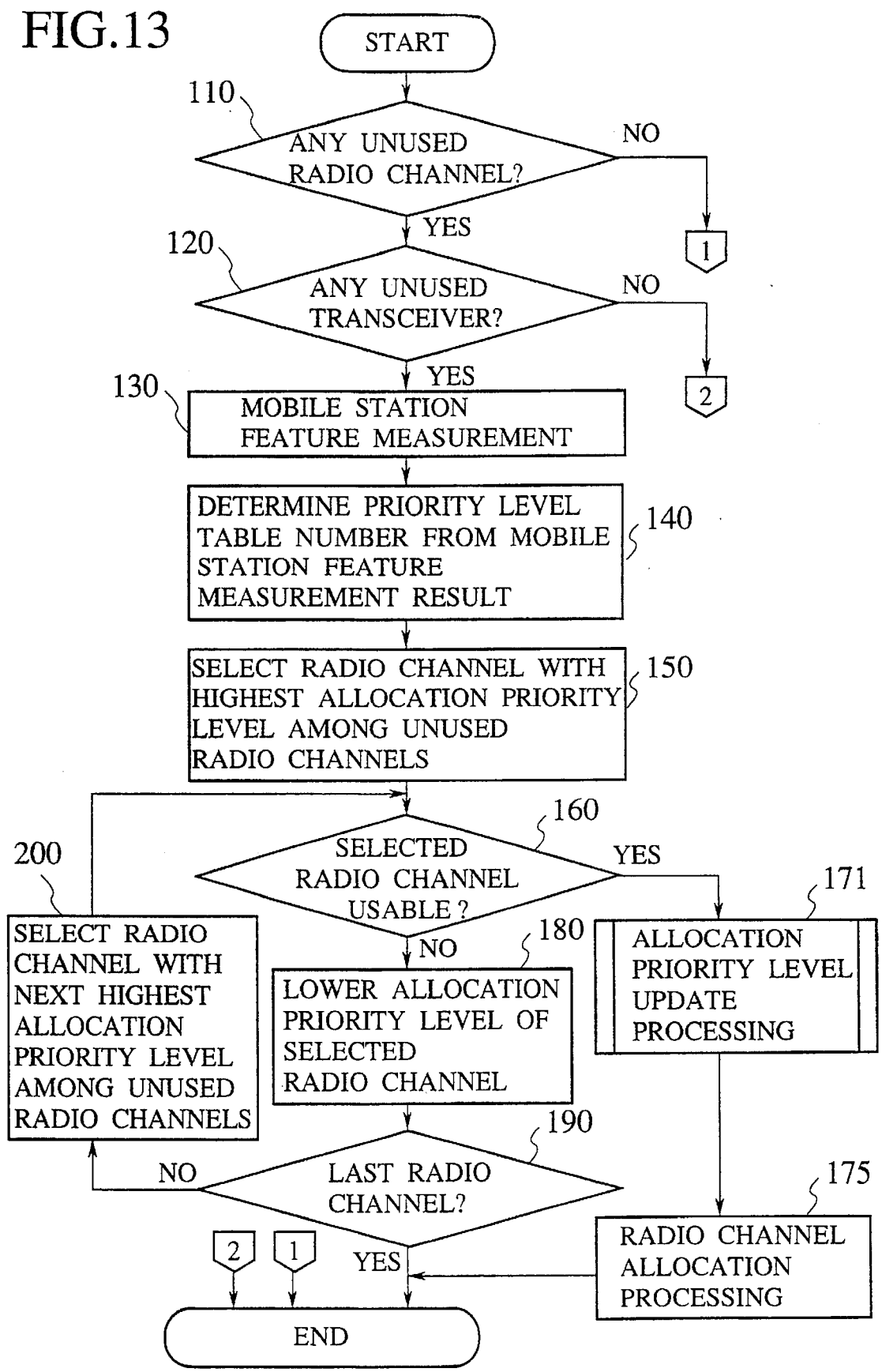
FIG. 13 is a flow chart for a radio channel allocation operation carried out by a base station in the third embodiment of the present invention.

In this third embodiment, the radio channel allocation operation is carried out according to the flow chart of FIG. 13, which differs from that of FIG. 8 in that the step 170 is replaced by the step 171 for carrying out the allocation priority level update processing according to the flow chart of FIG. 14 as follows. Here, it is assumed the groups are sequentially labelled by group IDs 1 to N, while the channels are sequentially labelled by channel IDs 1 to M, and the group corresponding to the priority level table number selected at the step 140, i.e., the group to which this mobile station belongs to, has a group ID=G, while the radio channel selected at the step 150, i.e., the radio channel which is successfully allocated to this mobile station, has a channel ID=CH.

Figure 15:
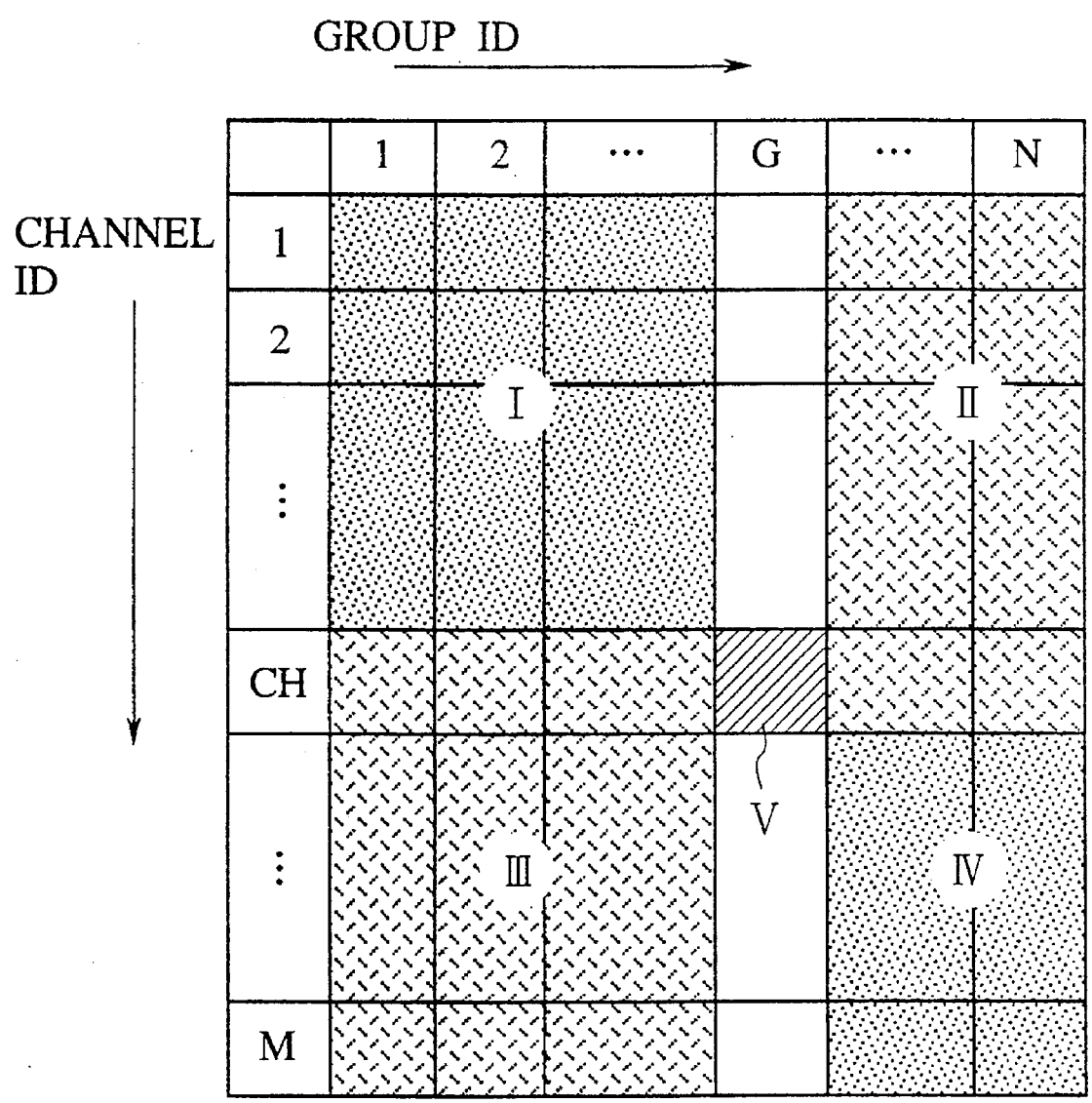
FIG. 15 is a conceptual illustration of a data configuration for an allocation priority level table for explaining the allocation priority level update processing in the third embodiment of the present invention.

First, at the step 1711, the allocation priority levels are raised for all the channels with channel IDs less than CH in the groups with group IDs less than G, i.e., the channels belonging to a region I indicated in FIG. 15.

Next, at the step 1712, the allocation priority levels are lowered for all the channels with channel IDs less than or equal to CH in the groups with group IDs greater than G, i.e., the channels belonging to a region II indicated in FIG. 15.

Next, at the step 1713, the allocation priority levels are lowered for all the channels with channel IDs greater than or equal to CH in the groups with group IDs less than G, i.e., the channels belonging to a region III indicated in FIG. 15.

Next, at the step 1714, the allocation priority levels are raised for all the channels with channel IDs greater than CH in the groups with group IDs greater than G, i.e., the channels belonging to a region IV indicated in FIG. 15.

Finally, at the step 1715, the allocation priority level is raised for the channel with a channel ID=CH in the group with a group ID=G, i.e., the channel located at a region V indicated in FIG. 15.

It is to be noted that the resulting updated allocation priority levels are identical regardless of the order of carrying out these steps 1711 to 1715, so that these steps 1711 to 1715 may be carried out in any desired order.

Figure 14:
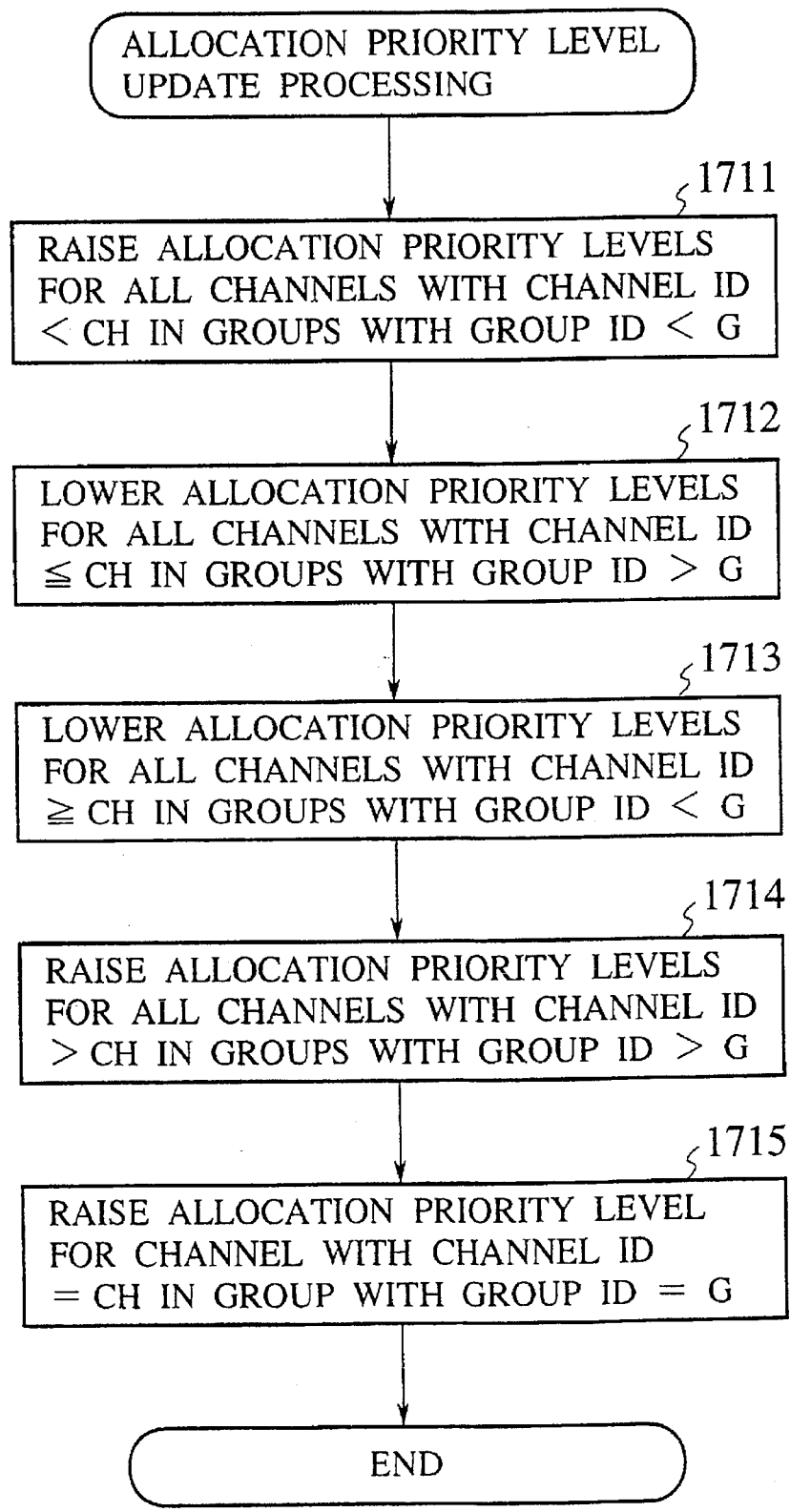
FIG. 14 is a detailed flow chart for an allocation priority level update processing contained in the flow chart of FIG. 13.

By means of this radio channel allocation operation including the allocation priority level update processing of FIG. 14, It is possible to realize the separate use of the radio channels for different mobile stations within each base station automatically according to the features of the mobile stations, as well as the separate use of the radio channels among different base stations automatically, while the allocation priority level is determined adaptively according to the past records of the channel use in each group as well as in the other groups such that it is possible to realize the clearer separate use of the radio channels within each base station, and consequently it is possible to realize the radio channel allocation scheme with the frequency utilization efficiency even higher than that achieved in the second embodiment described above by using a simple control.

In this third embodiment, the allocation accept/reject judgement of the selected radio channel at the step 160 can be made by various methods, such as those already described above for the second embodiment, and the threshold for the interference level or the carrier to interference power ratio to be used in this allocation accept/reject judgement may be set to be identical for all the groups, or to be different for each group, just as in the second embodiment. Moreover, the measurement of the state of the mobile station may be carried out by the mobile station itself, just as in the second embodiment.

Now, the result of the computer simulation for confirming the effect of this third embodiment will be described. This computer simulation used a model with a service area formed by 61 radio zones in forms of hexagonal cells with omni-directional antennas. In this model, the call is assumed to be generated according to the Poisson distribution, spatially uniformly throughout these radio zones, while the holding time is assumed to be in accordance with the exponential distribution with a mean equal to 120 sec., and the behavior of call within each radio zone is assumed to be identical. In addition, the mobile station which is going to make a call or receive a call is assumed to have selected the radio zone in advance by measuring the reception power of the perch channel (control channel) transmitted at the constant transmission power from the base station, while a number of radio channels available in the system as a whole is assumed to be 70, and only the identical channel interference is accounted as the interference. A number of priority level tables, i.e., a number of groups, is assumed to be 30, and the grouping is made according to the distance from the base station alone as the feature of the mobile station. Here, the distance of the mobile station from the base station is estimated by measuring the reception level at the base station of the radio wave transmitted from the mobile station. Moreover, the allocation accept/reject judgement result is set to be the acceptance when the carrier to interference power ratios for the upward and downward links are greater than or equal to a prescribed threshold.

Figure 16:
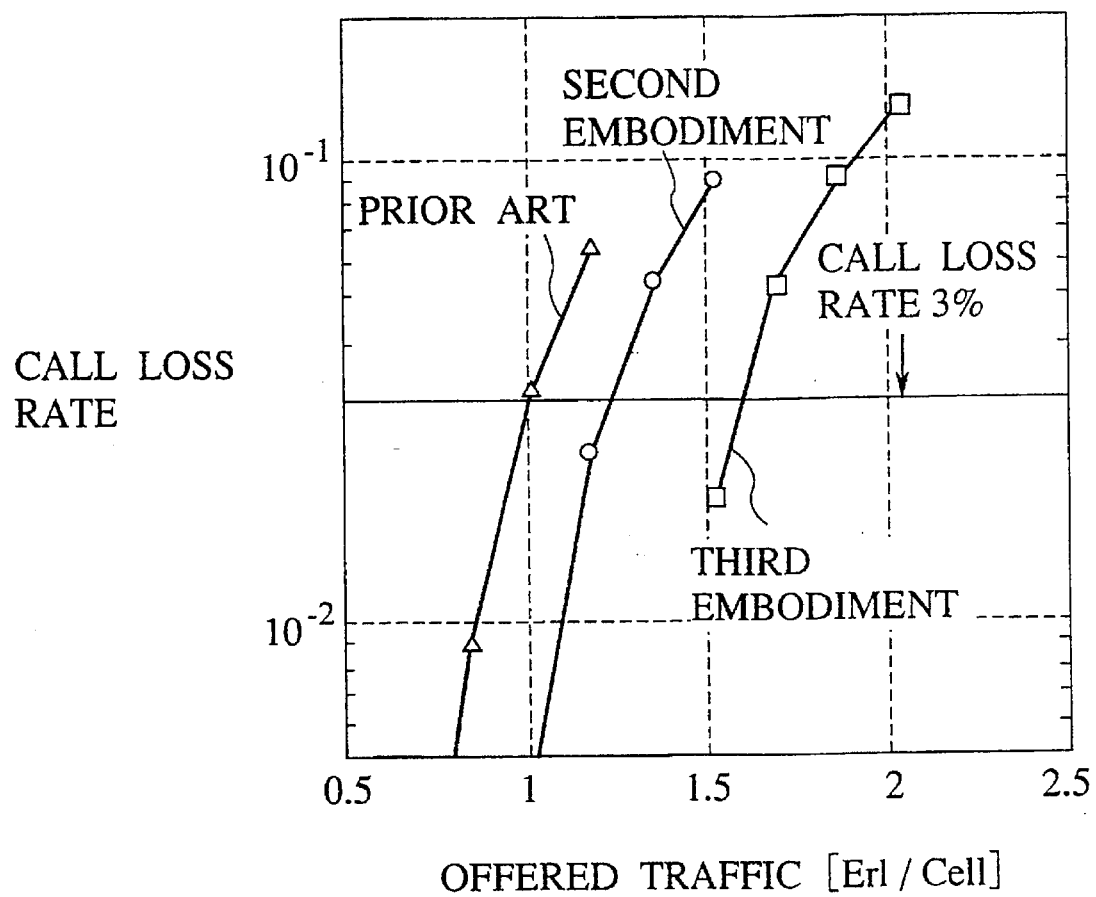
FIG. 16 is a graph showing a result of the computer simulation for confirming the effect of the third embodiment of the present invention.

The result obtained by this computer simulation is indicated in FIG. 16, where a system capacity is defined by an offered traffic per one radio zone at the call loss rate of 3%, and FIG. 16 shows a call loss rate as a function of the offered traffic per one radio zone which is normalized by the system capacity in the conventional radio channel allocation scheme using a single allocation priority level.

It can be seen from this computer simulation result that the radio channel allocation scheme of this third embodiment can realize a considerable improvement of approximately 60% for the system capacity compared with the conventional radio channel allocation scheme using a single allocation priority level, and a further improvement of approximately 28% for the system capacity compared with the second embodiment described above.

Thus, it can be confirmed that the radio channel allocation scheme of this third embodiment is indeed capable of improving the system capacity considerably while suppressing the control load to be sufficiently small, so that it is possible to realize a mobile communication system and a dynamic channel allocation scheme of an autonomous distribution type with a reduced control load and the further improved frequency utilization efficiency.

A case of using the moving direction and the moving speed of the mobile station as the features of the mobile station is similarly capable of achieving the similar effects by the similarly simple control.

As for the radio channels to be used in this third embodiment, it is possible to consider the use of the radio frequencies in the FDMA system, the use of the time slots in the TDMA system, and the repeated use of the spread codes or the frequency hopping patterns in the CDMA system, and the radio channel allocation scheme of this third embodiment is equally applicable to any of these cases, by making the allocation accept/reject judgement according to the measurement of the interference level or the carrier to interference power ratio as described above, for the substantially similar effects, just as in the second embodiment described above.

Now, the fourth embodiment of a mobile communication system and a channel allocation scheme according to the present invention will be described.

Figure 17:
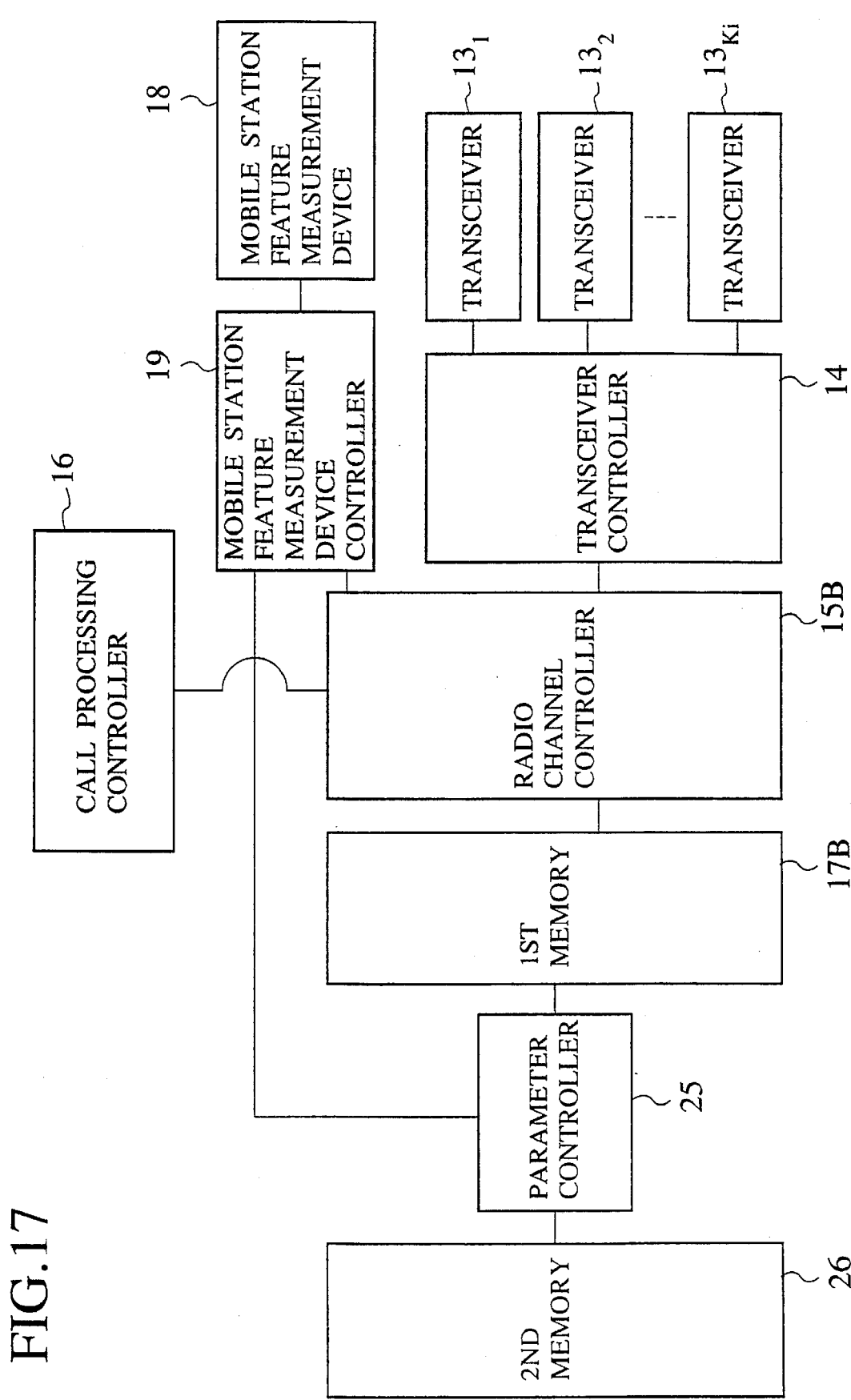
FIG. 17 is a block diagram showing a functional configuration relating to the radio channel allocation of a base station in the fourth embodiment of the present invention.

In this fourth embodiment, the mobile communication system has an overall configuration similar to that shown in FIG. 1 described above, where each base station 11 has a functional configuration relating to the radio channel allocation as shown in FIG. 17 which includes total Ki sets (Ki is an integer) of transceivers 13 ($13_1$ to $13_{Ki}$), a transceiver controller 14 connected with the transceivers 13, a radio channel controller 15B connected with the transceiver controller 14, a call processing controller 16 connected with the radio channel controller 15B, a first memory 17B connected with the radio channel controller 15B, a mobile station feature measurement device 18 for measuring a feature of each mobile station, a mobile station feature measurement device controller 19 connected with the mobile station feature measurement device 18 and the radio channel controller 15B, a parameter controller connected with the first memory 17B and the mobile station feature measurement device controller 19, and a second memory 26 connected with the parameter controller 25.

The radio channel controller 15B carries out reading, updating, and writing of the data stored in the first memory 17B and specified by a request from the call processing controller 16, and manages the radio channel currently used by each base station. The transceiver controller 14 carries out a management of the transceivers $13_1$ to $13_{Ki}$, and makes an allocation accept/reject judgement for a radio channel specified from the radio channel controller 15B.

The parameter controller 25 receives the mobile station feature measurement results from the mobile station feature measurement device 18 through the mobile station feature measurement device controller 19, and updates the measurement results stored in the second memory 26, while also calculating the thresholds for grouping of the mobile stations according to the measurement results stored in the second memory 25, and updates the threshold data stored in the first memory 17B. Here, the first memory 17B and the second memory 26 are indicated as separate components in FIG. 17, but these first and second memories 17B and 26 may be integrally provided by a single memory device if desired.

Figure 19:
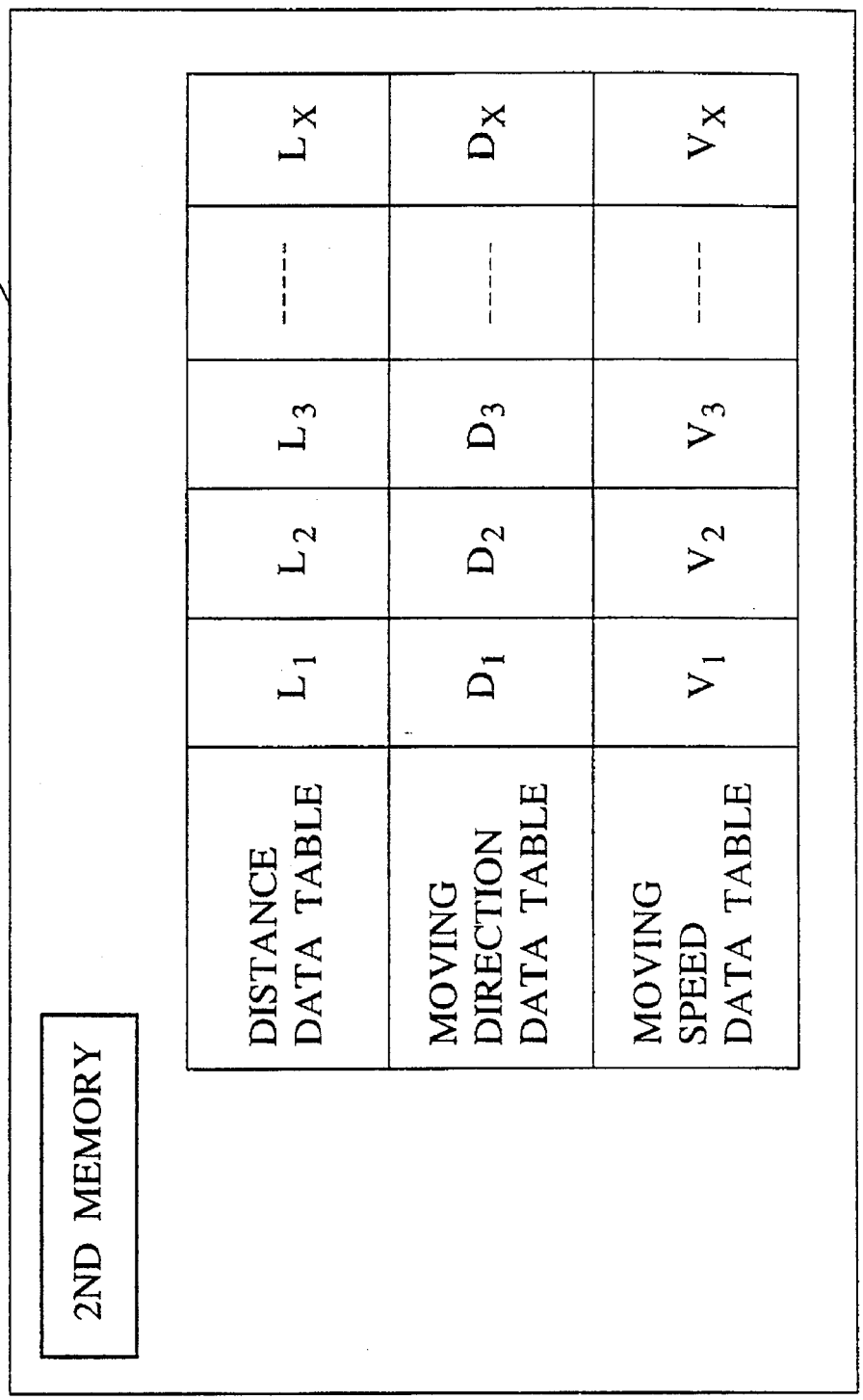
FIG. 19 is a diagrammatic illustration of data contents stored in a second memory of the base station of FIG. 17.

Here, the radio channels are allocated by dividing the mobile stations into a plurality of groups according to the features of the mobile stations such as the distances, the moving directions, and the moving speeds with respect to each base station. For this reason, the first memory 17B is used for storing a table of a channel ID ($ch_1$ to $ch_W$) of each of W radio channels (W is an integer), and a used/unused flag indicating whether each radio channel is currently used or unused, as well as a table of a group ID (#1 to #N) of each group of the radio channels, and corresponding thresholds for the distance, the moving direction, and the moving speed to be used in dividing the mobile stations into N groups, as shown in FIG. 18. On the other hand, the second memory 26 is used for storing a distance data table, a moving direction data table, and a moving speed data table for measured distances, moving directions, and moving speeds of the mobile stations in past X states (X is an integer) of the mobile stations, as shown in FIG. 19. Here, a number of past states for which the measurement results are to be registered in this second memory 26 may be different for the distances, the moving directions, and the moving speeds, if desired.

In this configuration of FIG. 17, the radio channel allocation operation is carried out according to the flow chart of FIG. 20 as follows.

When there is a radio channel allocation request with respect to a new call or a radio channel switching from the call processing controller 16, the radio channel controller 15B checks whether there exist radio channels which are currently unused or not, by reading the used/unused flags in the first memory 17A (step 210). In a case all the radio channels $ch_1$ to $ch_M$ are currently used, this fact is notified to the call processing controller 16 and the operation is terminated.

In a case there exist radio channels which are currently unused, next the radio channel controller 15B inquires the transceiver controller 14 as to whether there exist transceivers 13 which are currently unused or not (step 220). In a case there is no transceiver 13 which is currently unused, the transceiver controller 14 notifies this fact to the call processing controller 16 through the radio channel controller 15B and the operation is terminated.

In a case there exist transceivers 13 which are currently unused, next the radio channel controller 15B commands the mobile station feature measurement device controller 19 to control the mobile station feature measurement device 18 such that the extraction of the features of the mobile station to which the radio channel is to be allocated such as the distance, the moving direction, and the moving speed is carried out by the mobile station feature measurement device 18 (step 230).

Then, the mobile station feature measurement device controller 19 notifies the measurement result received from the mobile station feature measurement device 18 to the radio channel controller 15B and the parameter controller 25, and in response, the radio channel controller 15B compares the notified measurement result with the thresholds for determining the group ID stored in the first memory 17A, so as to determine the appropriate group ID (step 240).

Then, the currently usable radio channels among the radio channels of the group with the group ID determined at the step 240 are selected and allocated according to a prescribed radio channel allocation procedure (step 250). In a case there is no currently usable radio channel among the radio channels of the selected group, the radio channel controller 15B notifies this fact to the call processing controller 16 and the operation is terminated.

Next, the parameter controller 18 updates the measurement results recorded in the second memory 26 according to the measurement result notified from the mobile station feature measurement device controller 19 (step 260), and then reads out the past measurement results recorded in the second memory 28, calculates the thresholds for grouping the mobile stations from the read out past measurement results according to a prescribed calculation procedure, and updates the thresholds stored in the first memory 17B by the calculated thresholds, and the operation is terminated (step 270).

In this radio channel allocation operation, the state of the mobile station is measured by the base station at a time of the radio channel allocation, but it is also possible to modify this aspect of the above radio channel allocation operation such that the measurement of the state of the mobile station is carried out by the mobile station itself. In such a case, it is possible to utilize a method in which the mobile station measures its own state in response to a command issued from the base station at a time of calling or call receiving, and reports the measured state to the base station, or a method in which the mobile station measures its own state autonomously at a time of calling or call receiving, or at a time of being in an idle state, and reports the measured state to the base station, for example. This fourth embodiment is equally applicable to either one of these methods, for essentially the similar effects.

In addition, it is also possible to modify this radio channel allocation operation such that the updating of the measurement results and the thresholds at the steps 260 and 270 are carried out only when the radio channel allocation is successful at the step 250, and the steps 260 and 270 are skipped with the radio channel allocation is unsuccessful at the step 250. More specifically, in such a case, the radio channel allocation operation is carried out, according to the flow chart of FIG. 21 which differs from that of FIG. 20 in that there is provided an additional step 255 between the steps 250 and 280 for judging whether the radio channel allocation made at the step 250 is successful or not. In a case the radio channel allocation is successful, the operation proceeds to the steps 260 and 270, whereas otherwise the operation is terminated.

In general, the call which was not connected for such reason as that the currently unused transceiver does not exist or that the currently usable radio channel does not exist will be handled as a call loss in a loss system or as a waiting call in a delay system. The call which is handled as the call loss in the loss system or the call which is handled as the waiting call in the delay system but eventually not connected because of the limit on the waiting time or the abandonment of the waiting due to excessively long waiting time causes a phenomenon of repeated call generations and will be referred as a repeated call. When the system falls into the congested state and many repeated calls are generated, there is a possibility for the measurement results recorded in the second memory 26 to be largely deviated from the actual traffic distribution. However, by carrying out the updating of the measurement results and the thresholds at the steps 260 and 270 only when the radio channel allocation is successful at the step 250, it is possible to prevent the occurrence of such a deviation of the measurement results and consequently it becomes possible to determine more the thresholds more accurately.

Now, using a model shown in FIG. 22, the detailed procedure for determining the thresholds at the step 270 in the above radio channel allocation operation will be described. Here, the similar manner of determining the threshold can be used for a case of using the distance of the mobile station from the base station as the feature of the mobile station, a case of using the moving direction as the feature of the mobile station, and a case of using the moving speed as the feature of the mobile station, so that only a case of using the distance will be described below.

Figure 22:
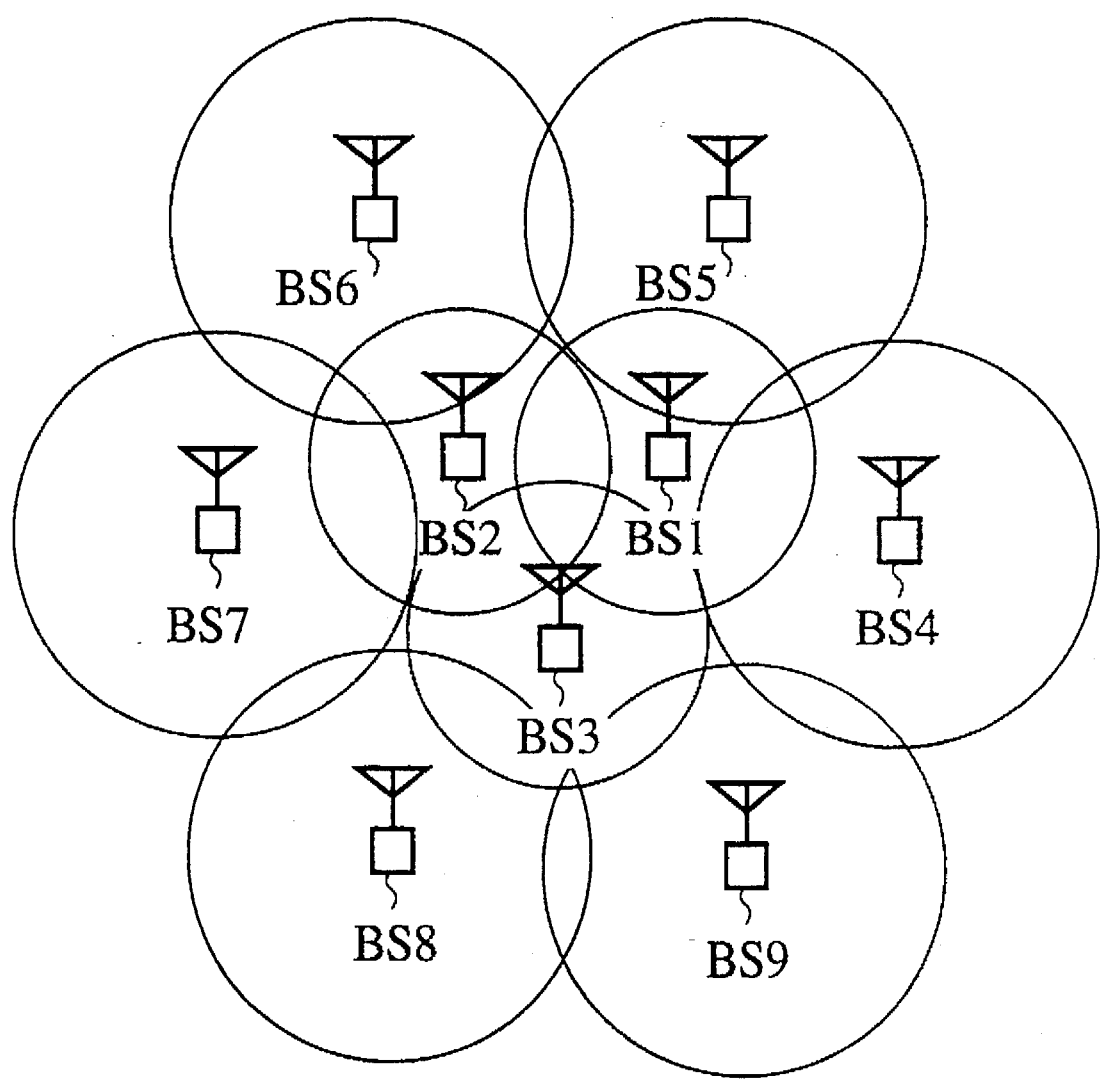
FIG. 22 is a schematic diagram of an exemplary mobile communication system model for explaining a detailed procedure for determining thresholds for grouping in the fourth embodiment of the present invention.

In the model shown in FIG. 22, the service area of the system are covered by nine base stations BS1 to BS9, where each of the base stations BS1 to BS3 provided at a central region with a relatively heavier traffic has a smaller cell radius, while each of the base stations BS4 to BS9 provided at a peripheral region with a relatively lighter traffic has a larger cell radius. The practical mobile communication system often adopts a scheme for providing more base stations with smaller cell radii at a metropolitan area with heavier traffic and less base stations with larger cell radii at a suburb area with lighter traffic, and the model of FIG. 22 effectively represents such a practical case.

Figure 23:
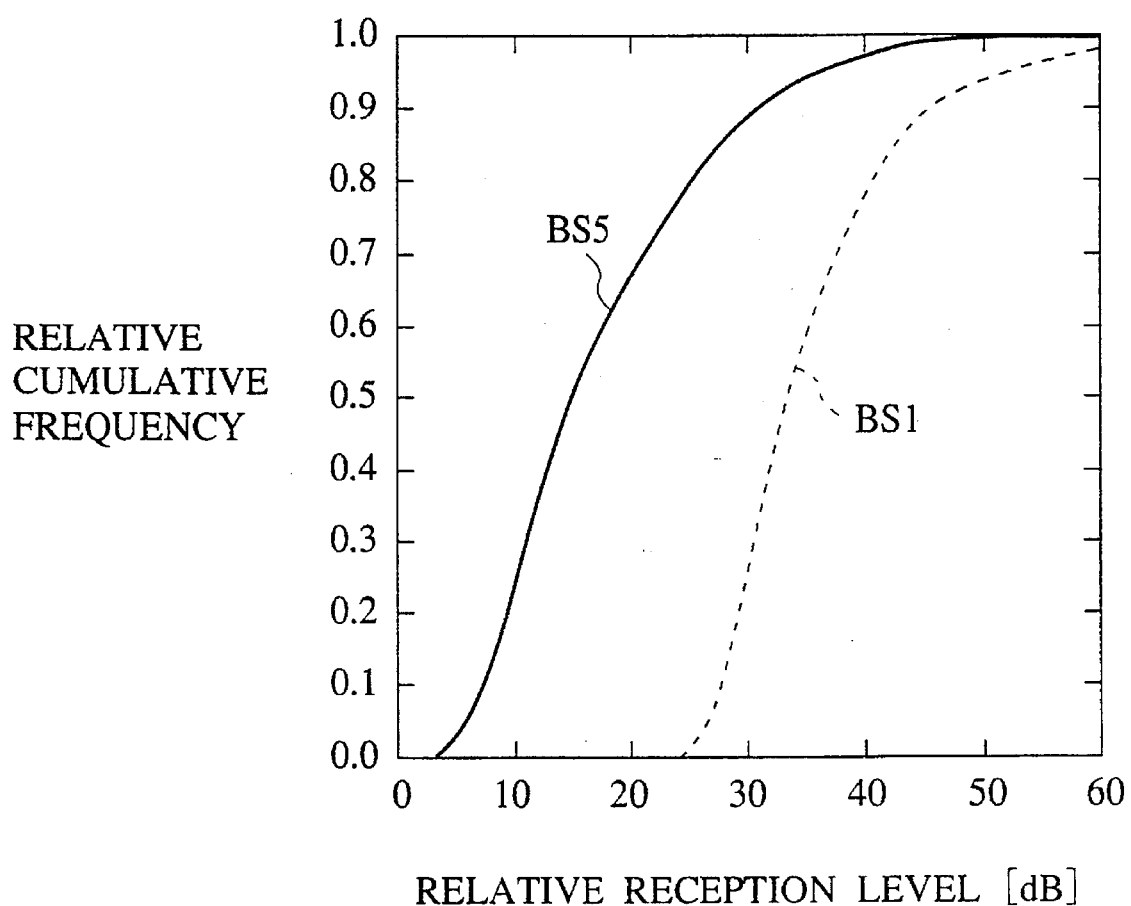
FIGS. 23, 24, and 25 are graphs showing a relative cumulative frequency as a function of relative reception level for explaining a detailed procedure for determining thresholds for grouping in the fourth embodiment of the present invention.
Figure 24:
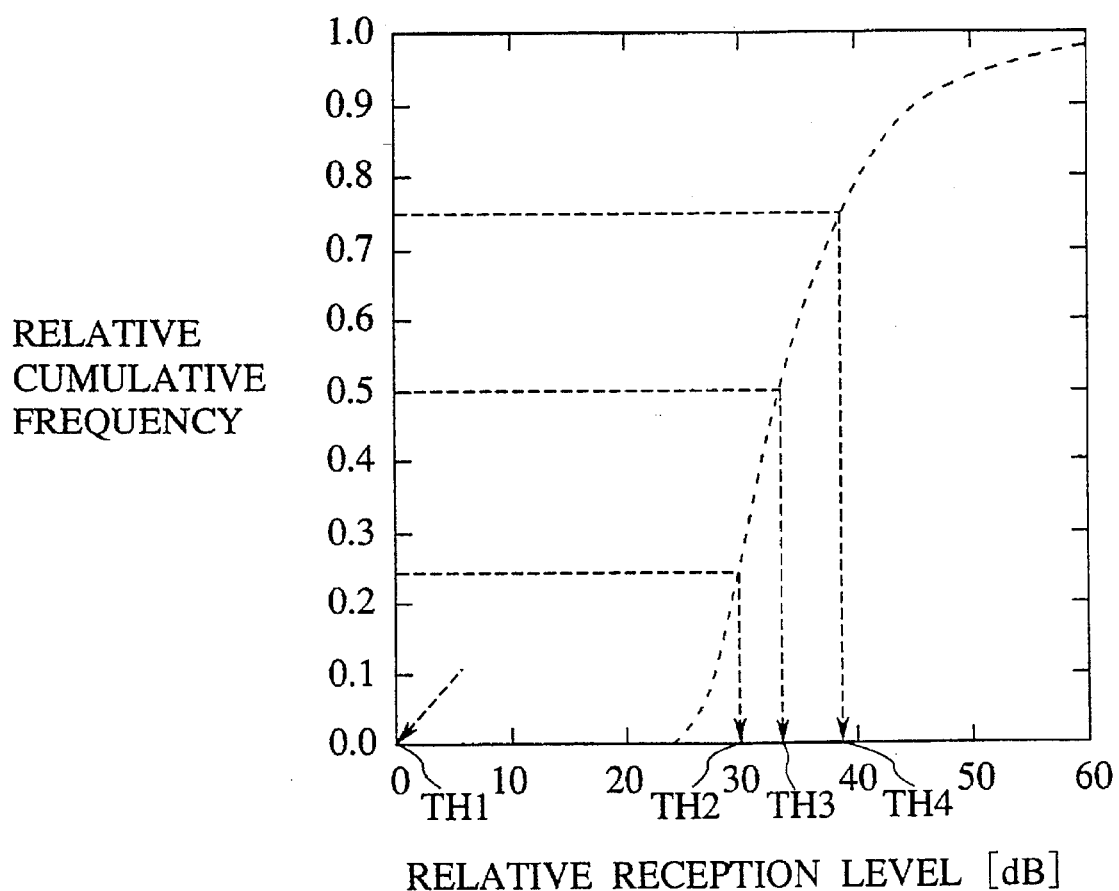
Figure 25:
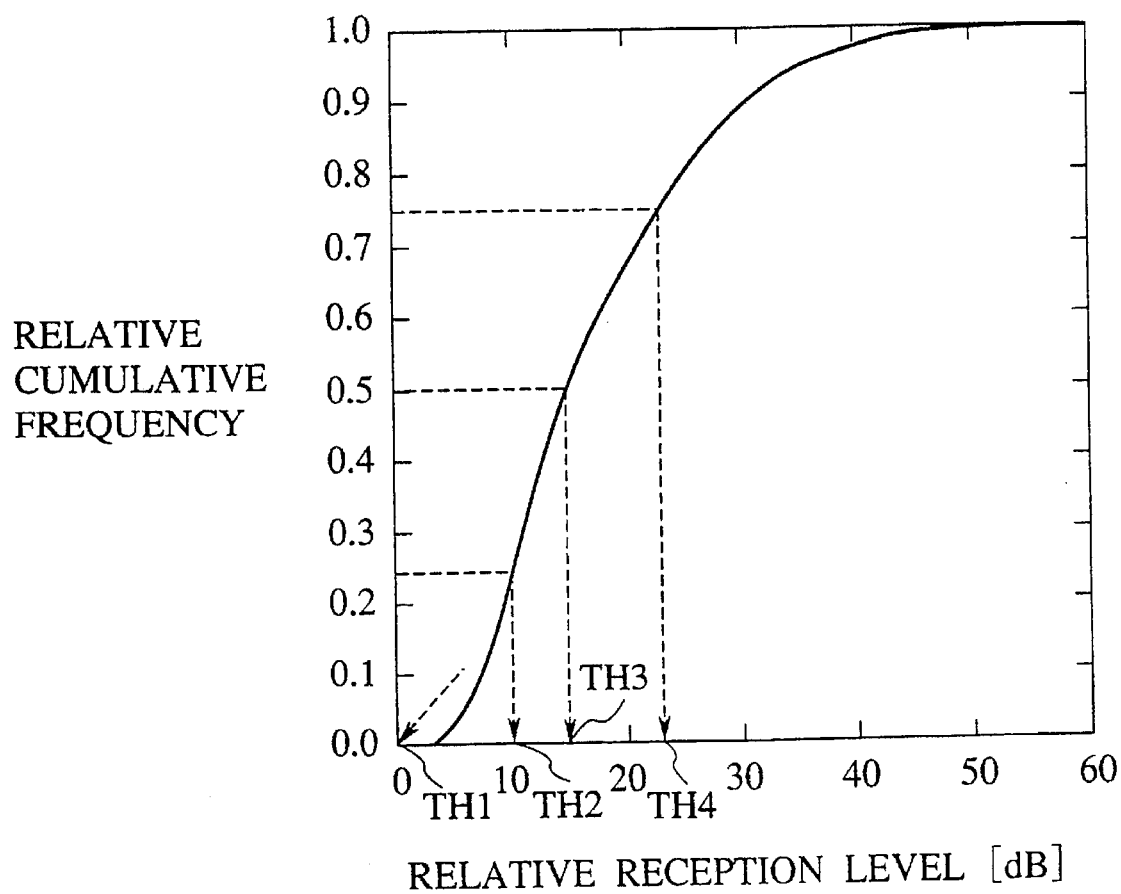

In this model of FIG. 22, the cumulative frequency distribution of the distances of the mobile station from the base station appears as indicated in FIG. 23 for the base station BS1 at the central region and the base station BS5 at the peripheral region. Here, the distances of the mobile station from the base stations are estimated from the reception levels which are normalized by a required reception level, i.e., a reception level required in securing the required signal to thermal noise ratio. Because of the difference in the cell radii, the base station BS5 with a larger cell radius has a lower reception level. Then, the thresholds obtained by using the recorded data at the base station BS1 and the base station BS5 are as indicated in FIGS. 24 and 25, respectively. These FIGS. 24 and 25 show a case of using four groups and determining the thresholds to make sizes of these groups equal to each other. The recorded data are expressed by the relative cumulative frequency, and the reception levels for which the relative cumulative frequency becomes equal to 0.25, 0.5, and 0.75 are determined as the thresholds TH2, TH3, and TH4 while the threshold TH1 is set equal to the required reception level.

In this manner, by using this fourth embodiment, the thresholds for grouping of the mobile stations can be determined according to the states of the mobile stations without requiring a tedious designing. It is to be noted that FIGS. 24 and 25 show a case of determining the thresholds to make sizes of the groups equal to each other, but this fourth embodiment is equally applicable to a case of determining the thresholds to make sizes of the groups different from each other by merely changing the relative cumulative frequency value to be referred in determining the thresholds.

By means of the above described processing, it becomes possible to provide a mobile communication system and a channel allocation scheme in which each base station can determine thresholds to be used in determining the grouping by its own autonomous processing, without requiring a cumbersome designing which takes enormous amounts of efforts and time and a re-designing in conjunction with the system expansion or the variation of the radio wave propagation state and/or the traffic distribution in the surrounding of each base station.

Next, a variation of the fourth embodiment described above which utilizes a manner of determining the thresholds for grouping according to the order statistic of the past mobile station feature measurement results will be described.

In this case, as indicated in FIG. 26, in addition to the distance data table for the measured distances $L_1$ to $L_X$, the moving direction data table for the measured moving directions $D_1$ to $D_X$, and the moving speed data table for the measured moving speeds $V_1$ to $V_X$ of the mobile stations in past X states of the mobile stations, the second memory 26 further stores a table of group sizes $PL_1$ to $PL_r$ of the groups for the grouping by distances of the mobile station from the base station, where r is a number of groups resulting from this grouping by distances, a table of group sizes $PD_1$ to $PD_s$ of the groups for the grouping by moving directions of the mobile station, where s is a number of groups resulting from this grouping by moving directions, and a table of group sizes $PV_1$ to $PV_t$ of the groups for the grouping by moving speeds of the mobile station, where t is a number of groups resulting from this grouping by moving speeds.

Each of these group sizes has a value predetermined by a system operator within a range of greater than 0 and less than 1 such that:

$$PL_1 + PL_2 + \ldots + PL_r = 1$$

$$PD_1 + PD_2 + \ldots + PD_s = 1$$

$$PV_1 + PV_2 + \ldots + PV_t = 1$$

It is to be noted here that FIG. 26 is depicted as if r>s>t, but this is only an exemplary case and the relationships among r, s, and t can be arbitrary. Also, a number X of past states for which the measurement results are to be registered in this second memory 26 may be different for the distances, the moving directions, and the moving speeds. In general, for a larger number of groups, a larger number of measurement results are required, so that the number of past states for which the measurement results are to be registered in this second memory 26 may be varied according to the required number of groups.

Then, the threshold for grouping is determined by the parameter controller 25 according to the following procedure. Here, the similar manner of determining the threshold can be used for a case of using the distance of the mobile station from the base station as the feature of the mobile station, a case of using the moving direction as the feature of the mobile station, and a case of using the moving speed as the feature of the mobile station, so that only a case of using the distance will be described below.

(a) In order to determine the threshold, the parameter controller 25 reads out the distance data $L_1$ to $L_X$ stored in the second memory 26, and rearrange them in ascending order of their values as follows.

$$L^{(1)} \leq L^{(2)} \leq \ldots \leq L^{(X)}$$

where a bracketed superscript indicates a sequential order number after this rearrangement, which is not related with the order in which the distance data $L_1$ to $L_X$ are stored in the second memory 26.

(b) Next, a natural number j which satisfies:

$$j/X < PL_1 \leq (j+1)/X$$

is obtained.

(c) Next, using the natural number j obtained in (b), the threshold (for distance) $TL_1$ is obtained by the following formula:

$$TL_1 = L^{(j)} + (PL_1 \times X - j) \times (L^{(j+1)} - L^{(j)})$$

(d) The above (b) and (c) are repeated for each of the other group sizes $PL_2$ to $PL_r$ similarly.

Figure 20:
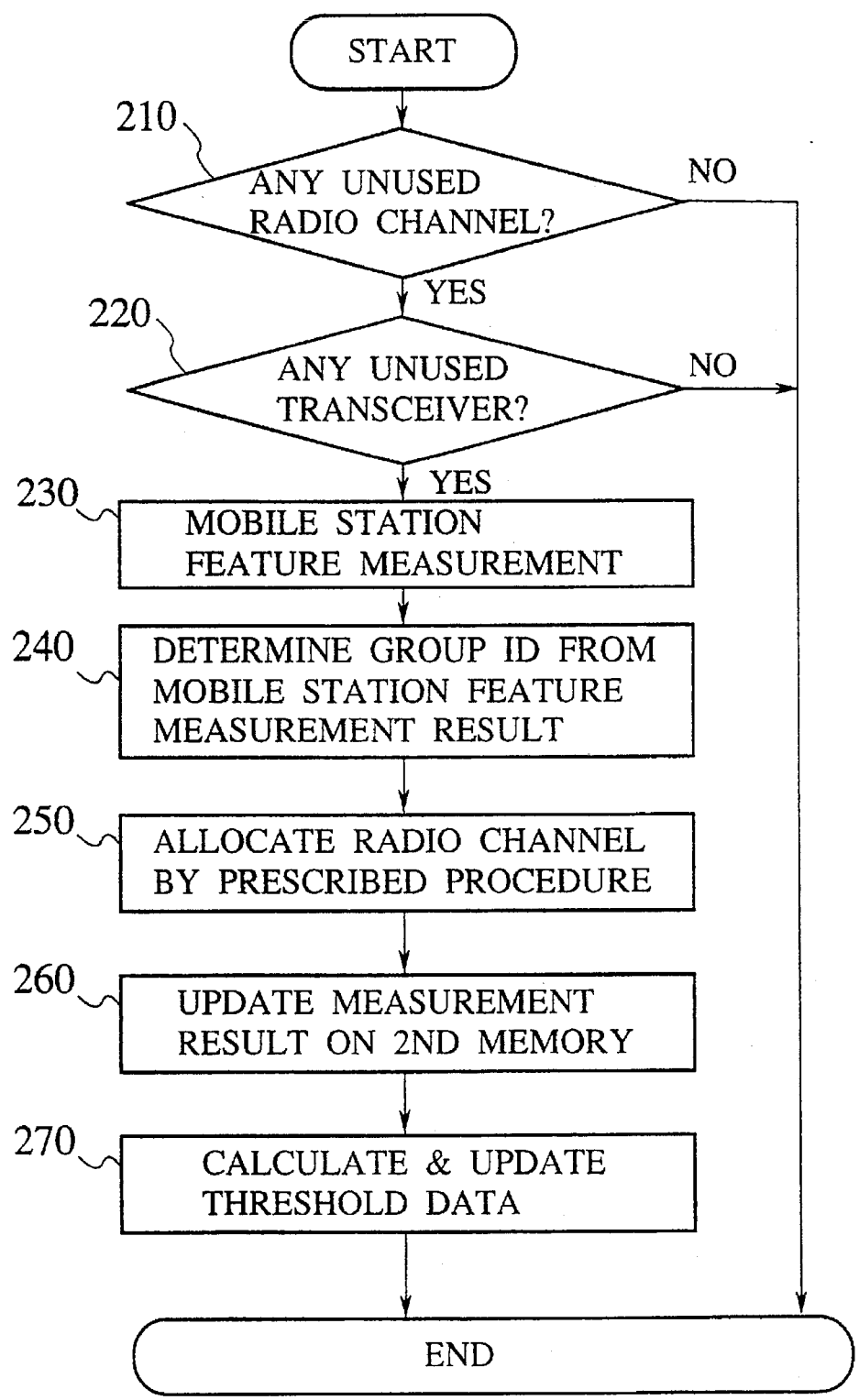
FIG. 20 is a flow chart for a radio channel allocation operation carried out by the base station of FIG. 17.
Figure 21:
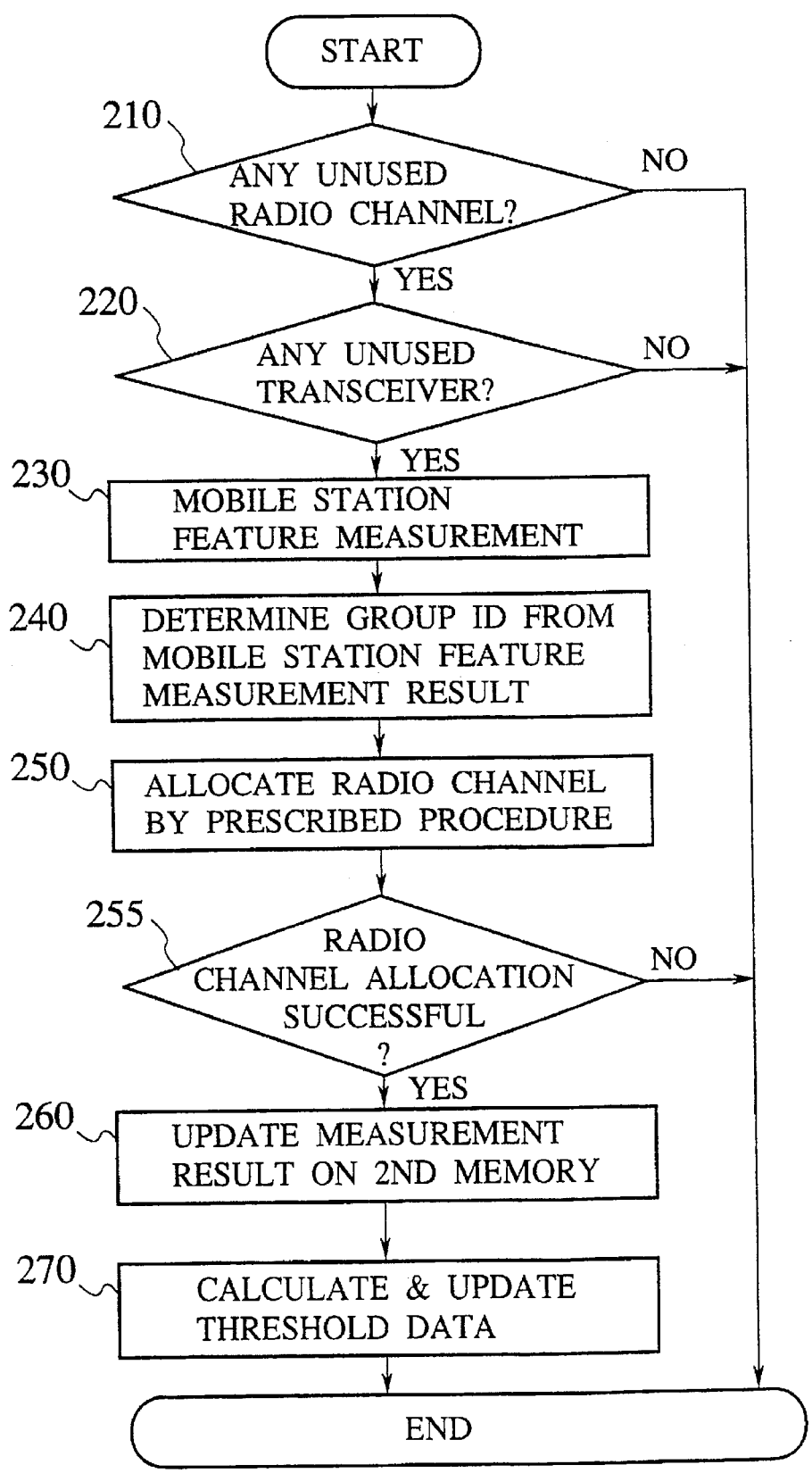
FIG. 21 is a flow chart for an alternative procedure of the radio channel allocation operation carried out by the base station of FIG. 17.

This procedure of (a) to (d) described above corresponds to the processing at the steps 260 and 270 in the flow chart of FIG. 20. The determination of the threshold using the order statistic corresponds to the estimation of the distribution function of the population according to the observation values obtained from the population, and it is a non-parametric estimation independent of the shape of the distribution function of the population.

By means of the above procedure of (a) to (d), the determination of the threshold can be made simpler compared with a manner of determining the threshold from the distribution function as explained above in conjunction with FIGS. 24 and 25, and it becomes possible to determine the threshold for grouping in accordance with the various different states of the different base stations, without requiring the cumbersome designing.

As for the radio channels to be used in this fourth embodiment, it is possible to consider the use of the radio frequencies in the FDMA system, the use of the time slots in the TDMA system, and the repeated use of the spread codes or the frequency hopping patterns in the CDMA system, and the radio channel allocation scheme of this fourth embodiment is equally applicable to any of these cases, for the substantially similar effects.

It is to be noted that the first embodiment described above may be combined with the second or third embodiment described above, and/or the fourth embodiment described above, while the second or third embodiment described above may be combined with the fourth embodiment described above, so as to enjoy the various effects of these embodiments together.

It is also to be noted that besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of allocating radio channels to communications between base stations and mobile stations in a mobile communication system, comprising the steps of:

(a) managing allocation priority levels for the radio channels available in the mobile communication system, according to past records of channel use for each radio channel at each base station;

(b) sequentially selecting each currently unused radio channel in an order of the allocation priority levels managed at the step (a), and sequentially making an allocation accept/reject judgement concerning whether each selected radio channel is usable or not, at said each base station;

(c) updating the allocation priority level managed at the step (a) of each radio channel selected at the step (b) by weighting past allocation accept/reject judgement results for said each radio channel with weight factors which vary according to respective ordered positions of said past allocation accept/reject judgement results relative to a current allocation accept/reject judgement result; and (d) allocating one radio channel which is judged as usable at the step (b) to a communication between said each base station and one mobile station.

2. The method of claim 1, wherein at the step (c), the weight factors are larger for newer allocation accept/reject judgement results and smaller for older allocation accept/reject judgement results.

3. The method of claim 1, wherein at the step (c), the allocation priority level is updated by raising the allocation priority level when the allocation accept/reject judgement result indicates an acceptance and lowering the allocation priority level when the allocation accept/reject judgement result indicates a rejection.

4. The method of claim 1, wherein at the step (c), the allocation priority level is updated according to a formula:

$$P(new) = P(old) \times \lambda + A$$

where P(new) is an updated allocation priority level, P(old) is a previous allocation priority level, $\lambda$ is a prescribed positive weight factor less than one, and A is a value assigned to the allocation accept/reject judgement result which takes one of two values with opposite signs predetermined in correspondence to a case of the allocation accept/reject judgement result indicating an acceptance and a case of the allocation accept/reject judgement result indicating a rejection.

5. The method of claim 4, wherein at the step (c), a value A takes a positive value in a case of the allocation accept/reject judgement result indicating an acceptance and a negative value in a case of the allocation accept/reject judgement result indicating a rejection.

6. The method of claim 1, wherein when an interference during a communication occurs, a switching of radio channels from an old radio channel to a new radio channel is carried out by the steps (b) and (d), while the step (c) also updates the allocation priority level of the old radio channel by a manner of updating the allocation priority level of a radio channel which is judged as not usable at the step (b).

7. The method of claim 6, wherein at the step (c), the allocation priority level of the old radio channel is updated by a value having a smaller absolute value than a value used for updating the allocation priority level of a radio channel which is judged as not usable at the step (b).

8. A method of allocating radio channels to communications between base stations and mobile stations in a mobile communication system, comprising the steps of:

(a) grouping the mobile stations into N groups according to states of the mobile stations at each base station, where N is an integer;

(b) managing N sets of allocation priority levels for each radio channel available in the mobile Communication system in correspondence to said N groups at each base station;

(c) for each mobile station, sequentially selecting each radio channel which is currently unused in an order of one of said N sets of the allocation priority levels managed at the step (b) which corresponds to one of said N groups grouped at the step (a) to which said each mobile station belongs to, and sequentially making an allocation accept/reject judgement concerning whether each selected radio channel is usable or not, at said each base station; and (d) allocating one radio channel which is judged as usable at the step (c) to a communication between said each base station and said each mobile station.

9. The method of claim 8, wherein at the step (b), the allocation priority levels for each radio channel are determined according to past records of channel use for said each radio channel.

10. The method of claim 8, wherein at the step (b), the allocation priority levels for each radio channel are determined according to past records of channel use for said each radio channel and other radio channels.

11. The method of claim 10, wherein at the step (b), when the allocation accept/reject judgement result for said each radio channel indicates an acceptance, the allocation priority level of each radio channel in one set of the allocation priority levels corresponding to one group to which said each mobile station belongs to is raised while the allocation priority levels of said each radio channel in other sets of the allocation priority levels are lowered.

12. The method of claim 10, wherein at the step (b), said N groups are labeled by sequential group IDs and the radio channels are labeled by sequential channel IDs, and when the allocation accept/reject judgement result for said each radio channel indicates an acceptance, the allocation priority level of each radio channel in one set of the allocation priority levels corresponding to one group to which said each mobile station belongs to is raised, and the allocation priority levels of those radio channels with channel IDs less than a channel ID of said each radio channel in those groups with the group IDs less than a group ID of said one group and the allocation priority levels of those radio channels with channel IDs greater than the channel ID of said each radio channel in those groups with the group IDs greater than the group ID of said one group are raised, while the allocation priority levels of those radio channels with channel IDs less than or equal to the channel ID of said each radio channel in those groups with the group IDs greater than the group ID of said one group and the allocation priority levels of those radio channels with channel IDs greater than or equal to the channel ID of said each radio channel in those groups with the group IDs less than the group ID of said one group are lowered.

13. The method of claim 8, wherein at the step (a), the mobile stations are grouped by using at least one of distances of the mobile stations from said each base station, the moving directions of the mobile stations, and the moving speeds of the mobile stations as features indicating the states of the mobile stations.

14. The method of claim 8, wherein at the step (a), at least one of said each base station and each mobile station measures a state of each mobile station.

15. A method of allocating radio channels to communications between base stations and mobile stations in a mobile communication system, comprising the steps of:

(a) determining thresholds for grouping the mobile stations according to past records of states of the mobile stations;

(b) grouping the mobile stations into N groups at each base station according to the thresholds for grouping determined at the step (a), where N is an integer;

(c) for each mobile station, sequentially selecting each radio channel which is currently unused and sequentially making an allocation accept/reject judgement concerning whether each selected radio channel is usable or not, at said each base station, according to a procedure prescribed for one of said N groups grouped at the step (b) to which said each mobile station belongs to; and (d) allocating one radio channel which is judged as usable at the step (c) to a communication between said each base station and said each mobile station.

16. The method of claim 15, wherein at the step (a), the past records of states of the mobile stations indicate measurement results of at least one of distances of the mobile stations from said each base station, the moving directions of the mobile stations, and the moving speeds of the mobile stations.

17. The method of claim 15, wherein at the step (a), the thresholds for grouping are updated according to newly measured states of the mobile stations only when said one radio channel is successfully allocated at the step (d).

18. The method of claim 15, wherein at the step (a), the thresholds for grouping are determined according to a cumulative frequency distribution of the past records of states of the mobile stations with respect to reception levels.

19. The method of claim 15, wherein at the step (a), the thresholds for grouping are determined according to an order statistic of the past records of states of the mobile stations.

20. The method of claim 19, wherein at the step (a), the thresholds for grouping are determined by the steps of:

(a1) rearranging data $L_1$ to $L_X$ on past states of each mobile station, where X is an integer, in an ascending order of values of the data, as rearranged data $L^{(1)}$ to $L^{(X)}$ given by:

$$L^{(1)} \leq L^{(2)} \leq \ldots \leq L^{(X)}$$

(a2) specifying a natural number j which satisfies:

$$j/X < PL_i \leq (j+1)/X$$

where $PL_i$ is a group size of an i-th group grouped by the past records of states of the mobile stations, (a3) obtaining a threshold $TL_i$ for the i-th group by the following formula:

$$TL_i = L^{(j)} + (PL_i \times X - j) \times (L^{(j+1)} - L^{(j)})$$

(a4) repeating the steps (a2) and (a3) for all values of i.

21. A mobile communication system, comprising:
mobile stations; and
base stations for communicating with the mobile stations by allocating radio channels, each base station including:
a memory for managing allocation priority levels for the radio channels available in the mobile communication system, according to past records of channel use for each radio channel; and
control means for sequentially selecting each currently unused radio channel in an order of the allocation priority levels managed in the memory and sequentially making an allocation accept/reject judgement concerning whether each selected radio channel is usable or not so as to allocate one radio channel which is judged as usable to a communication between said each base station and one mobile station, and updating the allocation priority level of each selected radio channel in the memory by weighting past allocation accept/reject judgement results for said each radio channel with weight factors which vary according to respective ordered positions of said past allocation accept/reject judgement results relative to a current allocation accept/reject judgement result.

22. The system of claim 21, wherein the control means updates the allocation priority level by using the weight factors which are larger for newer allocation accept/reject judgement results and smaller for older allocation accept/reject judgement results.

23. The system of claim 21, wherein the control means updates the allocation priority level by raising the allocation priority level when the allocation accept/reject judgement result indicates an acceptance and lowering the allocation priority level when the allocation accept/reject judgement result indicates a rejection.

24. The system of claim 21, wherein the control means updates the allocation priority level according to a formula:

$$P(\text{new}) = P(\text{old}) \times \lambda + A$$

where P(new) is an updated allocation priority level, P(old) is a previous allocation priority level, $\lambda$ is a prescribed positive weight factor less than one, and A is a value assigned to the allocation accept/reject judgement result which takes one of two values with opposite signs predetermined in correspondence to a case of the allocation accept/reject judgement result indicating an acceptance and a case of the allocation accept/reject judgement result indicating a rejection.

25. The system of claim 24, wherein the control means uses a value A which takes a positive value in a case of the allocation accept/reject judgement result indicating an acceptance and a negative value in a case of the allocation accept/reject judgement result indicating a rejection.

26. The system of claim 21, wherein when an interference during a communication occurs, the control means carries out a switching of radio channels from an old radio channel to a new radio channel, while also updating the allocation priority level of the old radio channel by a manner of updating the allocation priority level of a radio channel which is judged as not usable.

27. The system of claim 26, wherein the control means updates the allocation priority level of the old radio channel by a value having a smaller absolute value than a value used for updating the allocation priority level of a radio channel which is judged as not usable.

28. A mobile communication system, comprising:
mobile stations; and
base stations for communicating with the mobile stations by allocating radio channels, each base station including:
a memory for managing N sets of allocation priority levels for each radio channel available in the mobile communication system in correspondence to N groups into which the mobile stations are grouped according to states of the mobile stations, where N is an integer;
control means for sequentially selecting each radio channel which is currently unused, for each mobile station, in an order of one of said N sets of the allocation priority levels managed in the memory which corresponds to one of said N groups to which said each mobile station belongs to, and sequentially making an allocation accept/reject judgement concerning whether each selected radio channel is usable or not, so as to allocate one radio channel which is judged as usable to a communication between said each base station and said each mobile station.

29. The system of claim 28, wherein the control means also determines the allocation priority levels for each radio channel managed in the memory according to past records of channel use for said each radio channel.

30. The system of claim 28, wherein the control means also determines the allocation priority levels for each radio channel managed in the memory according to past records of channel use for said each radio channel and other radio channels.

31. The system of claim 30, wherein when the allocation accept/reject judgement result for said each radio channel indicates an acceptance, the control means also updates the allocation priority levels managed in the memory by raising the allocation priority level of each radio channel in one set of the allocation priority levels corresponding to one group to which said each mobile station belongs to, while lowering the allocation priority levels of said each radio channel in other sets of the allocation priority levels.

32. The system of claim 30, wherein said N groups are labeled by sequential group IDs and the radio channels are labeled by sequential channel IDs, and when the allocation accept/reject judgement result for said each radio channel indicates an acceptance, the control means also updates the allocation priority levels managed in the memory by raising the allocation priority level of each radio channel in one set of the allocation priority levels corresponding to one group to which said each mobile station belongs to, the allocation priority levels of those radio channels with channel IDs less than a channel ID of said each radio channel in those groups with the group IDs less than a group ID of said one group, and the allocation priority levels of those radio channels with channel IDs greater than the channel ID of said each radio channel in those groups with the group IDs greater than the group ID of said one group, while lowering the allocation priority levels of those radio channels with channel IDs less than or equal to the channel ID of said each radio channel in those groups with the group IDs greater than the group ID of said one group, and the allocation priority levels of those radio channels with channel IDs greater than or equal to the channel ID of said each radio channel in those groups with the group IDs less than the group ID of said one group.

33. The system of claim 28, wherein the memory manages the allocation priority levels by grouping the mobile stations according to at least one of distances of the mobile stations from said each base station, the moving directions of the mobile stations, and the moving speeds of the mobile stations as features indicating the states of the mobile stations.

34. The system of claim 28, wherein at least one of said each base station and each mobile station includes means for measuring a state of each mobile station.

35. A mobile communication system, comprising:
mobile stations; and
base stations for communicating with the mobile stations by allocating radio channels, each base station including:

memory for managing thresholds for grouping the mobile stations according to past records of states of the mobile stations, such that the mobile stations are grouped into N groups according to the thresholds for grouping, where N is an integer; and control means for sequentially selecting each radio channel which is currently unused and sequentially making an allocation accept/reject judgement concerning whether each selected radio channel is usable or not, for each mobile station, according to a procedure prescribed for one of said N groups to which said each mobile station belongs to, so as to allocate one radio channel which is judged as usable to a communication between said each base station and said each mobile station.

36. The system of claim 35, wherein the memory also manages the past records of states of the mobile stations indicating measurement results of at least one of distances of the mobile stations from said each base station, the moving directions of the mobile stations, and the moving speeds of the mobile stations.

37. The system of claim 35, further comprising means for updating the thresholds for grouping managed in the memory according to newly measured states of the mobile stations only when said one radio channel is successfully allocated by the control means.

38. The system of claim 35, further comprising means for determining the thresholds for grouping managed in the memory according to a cumulative frequency distribution of the past records of states of the mobile stations with respect to reception levels.

39. The system of claim 35, further comprising means for determining the thresholds for grouping managed in the memory according to an order statistic of the past records of states of the mobile stations.

40. The system of claim 39, wherein said means for determining the thresholds for grouping determines the thresholds for grouping by:

(a1) rearranging data $L_1$ to $L_X$ on past states of each mobile station, where X is an integer, in an ascending order of values of the data, as rearranged data $L^{(1)}$ to $L^{(X)}$ given by:

$$L^{(1)} \leq L^{(2)} \leq \ldots \leq L^{(X)}$$

(a2) specifying a natural number j which satisfies:

$$j/X < PL_i \leq (j+1)/X$$

where $PL_i$ is a group size of an i-th group grouped by the past records of states of the mobile stations, (a3) obtaining a threshold $TL_i$ for the i-th group by the following formula:

$$TL_i = L^{(j)} + (PL_i \times X - j) \times (L^{(j+1)} - L^{(j)})$$

(a4) repeating the steps (a2) and (a3) for all values of i.

* * * * *